(12) United States Patent
Nomura et al.

(10) Patent No.: US 10,593,227 B2
(45) Date of Patent: Mar. 17, 2020

(54) EVALUATION PROGRAM, STORAGE MEDIUM, EVALUATION METHOD, EVALUATION APPARATUS, AND VEHICLE

(71) Applicant: YAMAHA HATSUDOKI KABUSHIKI KAISHA, Iwata-shi, Shizuoka (JP)

(72) Inventors: Yasushi Nomura, Shizuoka (JP); Hiroshi Daimoto, Shizuoka (JP); Keisuke Morishima, Shizuoka (JP); Kazuhiro Matsumoto, Shizuoka (JP); Hajime Yoshikura, Shizuoka (JP); Haruo Okui, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 767 days.

(21) Appl. No.: 15/022,215

(22) PCT Filed: Sep. 25, 2014

(86) PCT No.: PCT/JP2014/075526
§ 371 (c)(1),
(2) Date: Mar. 16, 2016

(87) PCT Pub. No.: WO2015/050038
PCT Pub. Date: Apr. 9, 2015

(65) Prior Publication Data
US 2016/0232802 A1 Aug. 11, 2016

(30) Foreign Application Priority Data
Oct. 2, 2013 (JP) .................. 2013-207056

(51) Int. Cl.
*G09B 9/058* (2006.01)
*B60W 40/09* (2012.01)
*G09B 9/052* (2006.01)

(52) U.S. Cl.
CPC ............. *G09B 9/058* (2013.01); *B60W 40/09* (2013.01); *G09B 9/052* (2013.01)

(58) Field of Classification Search
CPC ........ G09B 9/058; G09B 9/052; B60W 40/09
(Continued)

(56) References Cited

U.S. PATENT DOCUMENTS

2007/0290867 A1* 12/2007 Kuramori ................ B60Q 9/00
340/576
2010/0209884 A1 8/2010 Lin et al.
(Continued)

FOREIGN PATENT DOCUMENTS

| CN | 102686476 A | 9/2012 |
| CN | 103278341 A | 9/2013 |

(Continued)

OTHER PUBLICATIONS

Official Communication issued in International Patent Application No. PCT/JP2014/075526, dated Dec. 22, 2014.
(Continued)

*Primary Examiner* — Robert P Bullington
(74) *Attorney, Agent, or Firm* — Keating and Bennett, LLP

(57) ABSTRACT

A non-transitory computer readable medium contains an evaluation program that causes a computer to perform steps of obtaining a vehicle stability score of vehicle driving skills based on measured data, obtaining a turning performance score of the vehicle driving skills based on the measured data, obtaining an overall evaluation result of the vehicle driving skills based on the vehicle stability score and the turning performance score using conversion information, and conveying the overall evaluation result to an output unit. The conversion information defines the overall evaluation result such that the overall evaluation result decreases as the (Continued)

turning performance score increases if the vehicle stability score is lower than a threshold and such that the overall evaluation result increases as the turning performance score increases if the vehicle stability score is higher than the threshold.

14 Claims, 11 Drawing Sheets

(58) Field of Classification Search
USPC .......................................................... 434/61
See application file for complete search history.

(56) References Cited

U.S. PATENT DOCUMENTS

| 2012/0259479 A1 | 10/2012 | Yoneta et al. |
| 2015/0044647 A1 | 2/2015 | Koyanagi et al. |

FOREIGN PATENT DOCUMENTS

| EP | 2 442 281 A1 | 4/2012 |
| EP | 2 517 952 A1 | 10/2012 |
| JP | 04-301875 A | 10/1992 |
| JP | 2013-178294 A | 9/2013 |
| WO | 2011/077638 A1 | 6/2011 |
| WO | 2013/099246 A1 | 7/2013 |

OTHER PUBLICATIONS

Official Communication issued in corresponding European Patent Application No. 14850499.6, dated Jul. 5, 2016.

Uys et al. "Criteria for Handling Measurement", Journal of Terramechanics, vol. 43, No. 1, Jan. 1, 2006, pp. 43-67.

Chandrasiri et al. "Driving Skill Analysis Using Machine Learning the Full Curve and Curve Segmented Cases", 2012 12th International on ITS Telecommunications (ITST), IEEE, Nov. 5, 2012, pp. 542-547.

* cited by examiner

Fig. 5

| | | vehicle stability score $S_v$ | | | | |
|---|---|---|---|---|---|---|
| | | 0 | 1 | ..... i | ..... | 100 |
| turning performance score $T_v$ | 100 | G(0,100) | G(1,100) | ..... G(i,100) | ..... | G(100,100) |
| | 99 | G(0,99) | G(1,99) | ..... G(i,99) | ..... | G(100,99) |
| | ⋮ | ⋮ | ⋮ | ⋮ | | ⋮ |
| | j | G(0,j) | G(1,j) | ..... G(i,j) | ..... | G(100,j) |
| | ⋮ | ⋮ | ⋮ | ⋮ | | ⋮ |
| | 0 | G(0,0) | G(1,0) | ..... G(i,0) | ..... | G(100,0) |

EVALUATION PROGRAM, STORAGE MEDIUM, EVALUATION METHOD, EVALUATION APPARATUS, AND VEHICLE

BACKGROUND OF THE INVENTION

1. Field of the Invention

The present invention relates to an evaluation program, a non-transitory computer readable storage medium, an evaluation method, an evaluation apparatus, and a vehicle.

2. Description of the Related Art

International Publication WO2011/077638 discloses an apparatus for determining a rider's driving skills. The apparatus includes a first vehicle state detector, a second vehicle state detector, a component separating unit, a vehicle stability characteristic determining unit, a turning characteristic determining unit, and an overall characteristic determining unit.

The first vehicle state detector detects a yaw rate and the like. The second vehicle state detector detects a roll rate and the like. The component separating unit separates detection values detected by the first and second vehicle state detectors into adjustment components and prediction components. The vehicle stability characteristic determining unit calculates a vehicle stability score based on a ratio of the adjustment components and the prediction components separated from the detection value detected by the first vehicle state detector. The turning characteristic determining unit calculates a turning characteristic score based on the prediction components separated from the detection value detected by the second vehicle state detector. The overall characteristic determining unit determines an overall characteristic score based one or both of the vehicle stability score and the turning performance score.

The overall characteristic score is, for example, a linear sum of the vehicle stability score and the turning performance score. Consequently, the overall characteristic score increases as the vehicle stability score increases. In addition, the overall characteristic score increases as the turning performance score increases. That is, the vehicle stability score is always a score-addition element, and the turning performance score is always a score-addition element.

SUMMARY OF THE INVENTION

The above example having such a configuration possesses the following drawbacks. Increasing the vehicle stability score and the turning performance score cause enhanced driving skills. However, a driver is not always required for enhancing both the vehicle stability score and turning performance score to the same extent throughout a course of enhancing the driving skills. For instance, it is assumed that the course of enhancing the driving skills includes a plurality of steps. The steps are, for example, a step of enhancing both the vehicle stability score and the turning performance score to the same extent, a step of enhancing either the vehicle stability score or the turning performance score selectively, and a step of suppressing either the vehicle stability score or the turning performance score.

In the conventional example, both the vehicle stability score and the turning performance score are each a score-adding element. In other words, in the conventional example, the driver is forced to enhance the vehicle stability score and the turning performance score individually. This leads to difficulty in flexibly forming the course of enhancing the driving skills.

In view of the state of the art noted above, preferred embodiments of the present invention provide an evaluation program, a non-transitory computer readable storage medium, an evaluation method, an evaluation apparatus, and a vehicle that allow more appropriate evaluation of vehicle driving skills.

One aspect of various preferred embodiments of the present invention provides an evaluation program for evaluating vehicle driving skills, the evaluation program causing a computer to perform the steps of obtaining a first evaluation result of vehicle driving skills based on measured data, obtaining a second evaluation result of the vehicle driving skills based on the measured data, obtaining an overall evaluation result of the vehicle driving skills based on the first evaluation result and the second evaluation result using conversion information, and conveying the overall evaluation result to an output unit. Here, the conversion information defines the overall evaluation result such that the overall evaluation result decreases as the second evaluation result increases if the first evaluation result is lower than a threshold, and such that the overall evaluation result increases as the second evaluation result increases if the first evaluation result is higher than the threshold.

With the above-described preferred embodiment according to the present invention, the computer having the evaluation program installed therein is caused to perform the step of obtaining the first evaluation result, the step of obtaining the second evaluation result, the step of obtaining the overall evaluation result, and the step of conveying the overall evaluation result to the output unit.

The first evaluation result includes information relating to an evaluation of the vehicle driving skills from a first point of view. The second evaluation result includes information relating to an evaluation of the vehicle driving skills from a second point of view, which differs from the first point of view. The overall evaluation result includes information relating to an evaluation of the vehicle driving skills from the first and second points of view. The overall evaluation result is determined from the first and second evaluation results and the conversion information.

The overall evaluation result has the following characteristics. That is, if the first evaluation result is lower than the threshold, the overall evaluation result decreases as the second evaluation result increases. In other words, if the first evaluation result is lower than the threshold, the second evaluation result is a point-deduction element that decreases the overall evaluation result. On the other hand, if the first evaluation result is higher than the threshold, the overall evaluation result increases as the second evaluation result increases. In other words, if the first evaluation result is higher than the threshold, the second evaluation result is a point-addition element that increases the overall evaluation result. As noted above, the second evaluation result is switched back and forth between the point-addition element and the point-deduction element in accordance with the first evaluation result.

The overall evaluation result is conveyed to the output unit. This yields a suitable indication of the overall evaluation result to the driver via the output unit. Moreover, if the first evaluation result is lower than the threshold, the lower overall evaluation result is indicated as the second evaluation result increases. This is equivalent to promotion of suppressing the second evaluation result to the driver. In addition, if the first evaluation result is higher than the threshold, the higher overall evaluation result is indicated as the second evaluation result increases. This is equivalent to promotion of enhancing the second evaluation result to the driver. As noted above, driving skills are enhanced through the step of suppressing the second evaluation result and the step of enhancing the second evaluation result.

Consequently, the evaluation program according to this aspect of various preferred embodiments of the present invention allows the computer to perform more suitable evaluation of the vehicle driving skills.

In the above aspect of various preferred embodiments of the present invention, it is preferred that the conversion information defines the overall evaluation result such that the overall evaluation result increases as the first evaluation result increases.

The overall evaluation result increases as the first evaluation result increases regardless of the second evaluation result. That is, the evaluation result is always a point-addition element that increases the overall evaluation result. This is equivalent to constant promotion of enhancing the first evaluation result to the driver. Specifically, this is equivalent to the following. That is, if the first evaluation result is lower than the threshold, the driver is prompted to enhance only the first evaluation result. If the first evaluation result is higher than the threshold, the driver is prompted to enhance the first evaluation result in addition to the second evaluation result. As noted above, driving skills are enhanced through the step of suppressing the second evaluation result and thus focusing on enhancement of only the first evaluation result, and the step of enhancing both the first evaluation result and the second evaluation result.

In the above aspect of various preferred embodiments of the present invention, it is preferred that the conversion information is at least either a conversion function defining the overall evaluation result with the first evaluation result and the second evaluation result as variables or a conversion map including the first evaluation result and the second evaluation result associated with the overall evaluation result. This allows the computer to perform the step of obtaining the overall evaluation result suitably.

In the above aspect of various preferred embodiments of the present invention, it is preferred that the step of conveying the overall evaluation result to the output unit is performed by conveying the overall evaluation result in the form of information transmittable visibly to a driver or in the form of information transmittable auditorily to the driver. This allows clear indication of the overall evaluation result to the driver.

Another aspect of various preferred embodiments of the present invention provides a non-transitory computer readable storage medium that stores the evaluation program described above.

With the other aspect of various preferred embodiments of the present invention, the computer can read the evaluation program. This allows the evaluation program to be installed in the computer appropriately, thus achieving appropriate evaluation of the vehicle driving skills by the computer.

Another aspect of various preferred embodiments of the present invention provides an evaluation method of evaluating vehicle driving skills. The evaluation method includes the steps of obtaining a first evaluation result of the vehicle driving skills based on measured data, obtaining a second evaluation result of the vehicle driving skills based on the measured data, obtaining an overall evaluation result from the first evaluation result and the second evaluation result using conversion information, and indicating the overall evaluation result to a driver via an output unit. Here, the conversion information defines the overall evaluation result such that the overall evaluation result decreases as the second evaluation result increases if the first evaluation result is lower than a threshold, and such that the overall evaluation result increases as the second evaluation result increases if the first evaluation result is higher than the threshold.

The evaluation method according to the other aspect of various preferred embodiments of the present invention includes the steps of obtaining the first evaluation result, obtaining the second evaluation result, obtaining the overall evaluation result, and indicating the overall evaluation result. A computer preferably performs the steps of obtaining the first evaluation result, obtaining the second evaluation result, and obtaining the overall evaluation result.

In the step of obtaining the overall evaluation result obtaining step, a combination of the first and second evaluation results is converted into the overall evaluation result with the conversion information. If the first evaluation result is lower than a threshold, the second evaluation result is a point-deduction element for the overall evaluation result. In contrast to this, if the first evaluation result is higher than the threshold, the second evaluation result is a point-addition element for the overall evaluation result.

In the step of indicating the overall evaluation result, if the first evaluation result is lower than the threshold, the lower overall evaluation result is indicated as the second evaluation result increases. In contrast to this, if the first evaluation result is higher than the threshold, the higher overall evaluation result is indicated as the second evaluation result increases. Accordingly, the second evaluation result is switched back and forth between a stage of suppressing the second evaluation result and a stage of enhancing the second evaluation result in accordance with the first evaluation result.

As noted above, the evaluation method according to the other aspect of various preferred embodiments of the present invention allows more appropriate evaluation of the vehicle driving skills.

In the evaluation method mentioned above, it is preferred that the conversion information defines the overall evaluation result such that the overall evaluation result increases as the first evaluation result increases. The first evaluation result is always a point-addition element. Accordingly, a period of time before the first evaluation result reaches the threshold may be a stage of enhancing the first evaluation result selectively, and a period of time after the first evaluation result exceeds the threshold may be a stage of enhancing both the first evaluation result and the second evaluation result individually.

In the evaluation method mentioned above, it is preferred that the conversion information is at least either a conversion function defining the overall evaluation result with the first evaluation result and the second evaluation result as variables or a conversion map having the first evaluation result and the second evaluation result associated with the overall evaluation result. This allows suitable obtainment of the overall evaluation result.

In the step of indicating the overall evaluation result in the evaluation method mentioned above, it is preferred that the output unit indicates at least either a character representing the overall evaluation result or a color corresponding to the overall evaluation result. This allows clear indication of the overall evaluation result.

In the step of indicating the overall evaluation result in the evaluation method mentioned above, it is preferred that the output unit indicates a graph having a two-dimensional coordinate with a first axis and a second axis, and a plotted point with a first axis coordinate as the first evaluation result and a second axis coordinate as the second evaluation result. This allows clear indication of the first and second evaluation results.

In the step of indicating the overall evaluation result in the evaluation method mentioned above, it is preferred that the output unit outputs sound as which the overall evaluation result is read. This allows smooth conveyance of the overall evaluation result to the driver.

Another aspect of various preferred embodiments of the present invention provides an evaluation apparatus that evaluates vehicle driving skills. The evaluation apparatus includes a first evaluation unit that obtains a first evaluation result of vehicle driving skills based on measured data, a second evaluation unit that obtains a second evaluation result of the vehicle driving skills based on the measured data, an overall evaluation unit that obtains an overall evaluation result of the vehicle driving skills from the first evaluation result and the second evaluation result using conversion information, and an output controller that conveys the overall evaluation result to an output unit. The conversion information defines the overall evaluation result such that the overall evaluation result decreases as the second evaluation result increases if the first evaluation result is lower than a threshold, and such that the overall evaluation result increases as the second evaluation result increases if the first evaluation result is higher than the threshold.

In the above aspect of various preferred embodiments of the present invention, the evaluation apparatus includes the first evaluation unit, the second evaluation unit, the overall evaluation unit, and the output controller.

The overall evaluation unit converts the first evaluation result and the second evaluation result into the overall evaluation result using the conversion information. In a relationship between the first and second evaluation results and the overall evaluation result defined with the conversion information, the second evaluation result is a point-deduction element if the first evaluation result is lower than the threshold, whereas the second evaluation result is a point-addition element if the first evaluation result is higher than the threshold.

The output controller allows suitable indication of the overall evaluation result to the driver via the output unit. If the first evaluation result is lower than the threshold, the output unit indicates the lower overall evaluation result as the second evaluation result increases. If the first evaluation result is higher than the threshold, the output unit indicates the higher overall evaluation result as the second evaluation result increases. This allows back and forth switching between the stage of suppressing the second evaluation result and the stage of enhancing the second evaluation result in accordance with the first evaluation result.

As noted above, the evaluation apparatus according to the above aspect of various preferred embodiments of the present invention achieves more appropriate evaluation of the vehicle driving skills.

It is preferred that the evaluation apparatus mentioned above further includes a measuring unit that obtains the measured data. The evaluation apparatus with the measuring unit yields simple evaluation of the driving skills.

It is preferred that the evaluation apparatus mentioned above includes the output unit that is controlled by the output controller to indicate the overall evaluation result to a driver. The evaluation apparatus with the output unit allows simple indication of the driving skills.

Moreover, another aspect of various preferred embodiments of the present invention provides a vehicle including the evaluation apparatus mentioned above.

The vehicle according to the above aspect of various preferred embodiments of the present invention with the evaluation apparatus allows appropriate evaluation of the vehicle driving skills.

The present specification also discloses a skill evaluation apparatus according an additional preferred embodiment of the present invention.

In the above examples of various preferred embodiments of the present invention, it is preferred that the measured data includes at least either measured data on a vehicle state or measured data on a driver state.

In the above examples of various preferred embodiments of the preset invention, it is preferred that the measured data on the vehicle state is at least one of a yaw rate, a yaw angle, a roll rate, a roll angle, a pitch rate, a pitch angle, a steering angle, a caster angle, a speed, or a position of the vehicle.

In the above examples of various preferred embodiments of the present invention, it is preferred that the measured data on the driver state is at least one of a yaw rate, a yaw angle, a roll rate, a roll angle, a pitch rate, a pitch angle of a driver's head, or an eyeball motion of a driver.

The preferred embodiments described in the preceding three paragraphs allow suitable evaluation of the driving skills. That is, the first and second evaluation results are each obtainable suitably.

In the above examples of various preferred embodiments of the present invention, it is preferred that the first evaluation result is obtained from the measured data using first evaluation criterion information, and the second evaluation result from the measured data using second evaluation criterion information different from the first evaluation criterion information.

According to another preferred embodiment of the present invention, an evaluation system includes an evaluation apparatus according to one of the preferred embodiments of the present invention described above, and a measuring unit external to the evaluation apparatus to obtain measured data and convey the measured data to the evaluation apparatus.

The preferred embodiment of the present invention described in the preceding paragraph allows more suitable evaluation of the vehicle driving skills. Here, the measuring unit external to the evaluation apparatus is so-called an external measuring unit. The system may further include, besides the external measuring unit, a measuring unit internal to the evaluation apparatus.

According to an additional preferred embodiment of the present invention, an evaluation system includes an evaluation apparatus according to one of the preferred embodiments of the present invention described above and an output unit external to the evaluation apparatus to receive an overall evaluation result conveyed from the evaluation apparatus and indicate the overall evaluation result to the driver.

The preferred embodiment of the present invention described in the preceding paragraph allows more suitable evaluation of the vehicle driving skills. Here, the output unit external to the evaluation apparatus is so-called an external output unit. This system may further include, besides the external output unit, an output unit internal to the evaluation apparatus.

Another preferred embodiment of the present invention provides a vehicle including an evaluation system according to one of the preferred embodiments of the present invention described above.

The preferred embodiment of the present invention described in the preceding paragraph provides the vehicle with the evaluation system, achieving suitable evaluation of the vehicle driving skills.

The evaluation program, the non-transitory computer readable storage medium, the evaluation method, the evaluation apparatus, and the vehicle according to the various preferred embodiments of the present invention provide more appropriate evaluation of the vehicle driving skills.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is one example of a conversion map.

DETAILED DESCRIPTION OF THE PREFERRED EMBODIMENTS

Preferred Embodiment 1

The following describes Preferred Embodiment 1 of the present invention with reference to drawings. In Preferred Embodiment 1, a two-wheeled motor vehicle has been described as one non-limiting example of a vehicle. In the following, terms front, rear, right, left, up, and down mean "front", "rear", "right", "left", "up" and "down", respectively, for a rider on the two-wheeled motor vehicle 1.

Figure 1:
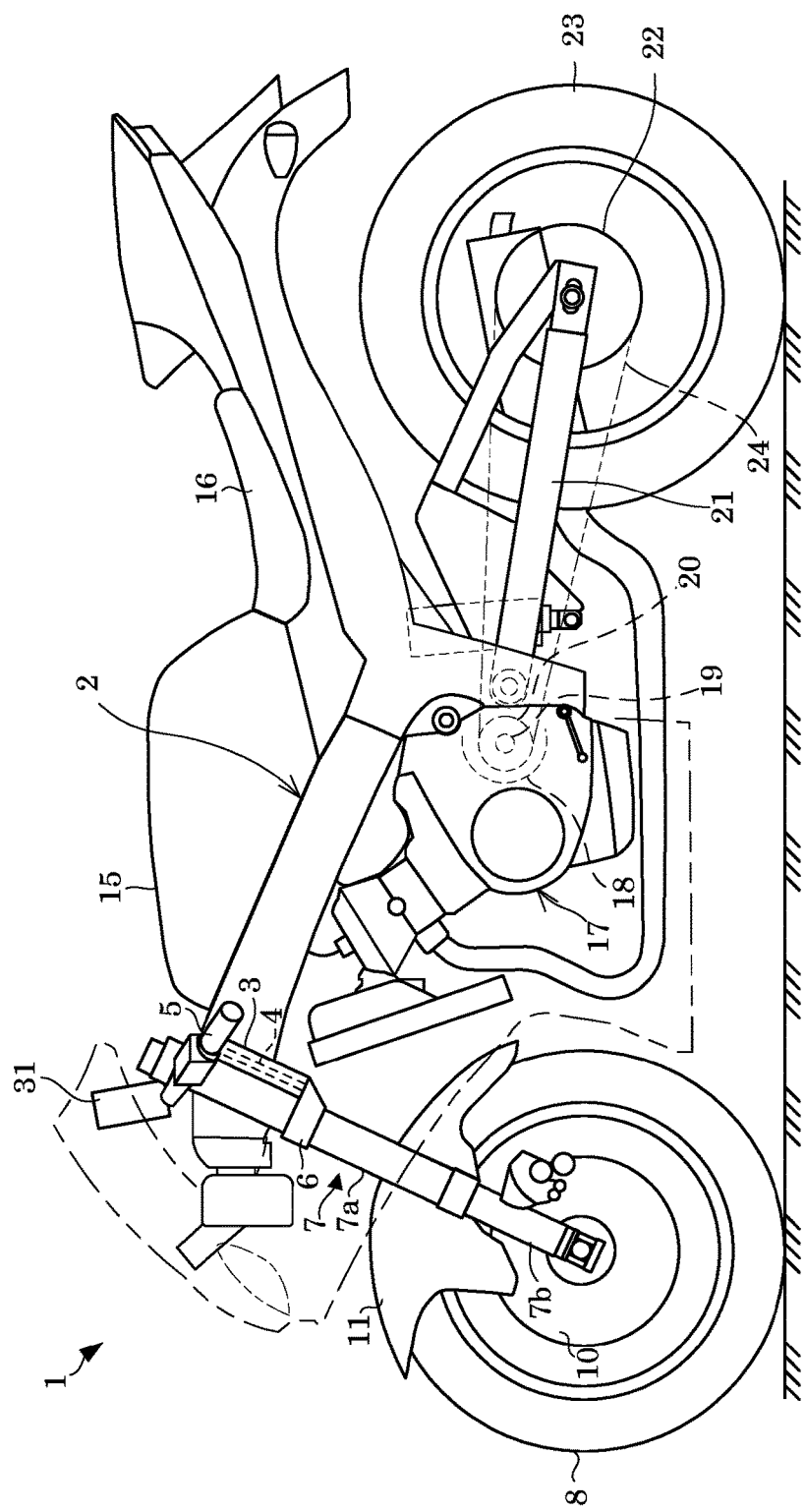
FIG. 1 is a side view illustrating an outline construction of a two-wheeled motor vehicle according to Preferred Embodiment 1 of the present invention.

FIG. 1 is a side view illustrating an outline construction of the two-wheeled motor vehicle according to one preferred embodiment of the present invention. The two-wheeled motor vehicle 1 includes a main frame 2. The main frame 2 includes a head tube 3 provided on a front upper end thereof. A steering shaft 4 is inserted into the head tube 3. The steering shaft 4 includes an upper end on which an upper bracket (not shown) is fixed, and a lower end on which a lower bracket 6 is fixed. Both the brackets retain paired right and left front forks 7 that are extendible and contractible. A handle 5 is connected to the upper bracket. The handle 5 includes a throttle operating unit and a brake lever (not shown) on the right thereof, and a clutch lever (not shown) on the left thereof.

Rotating the handle 5 causes the front forks 7 to swing around the steering shaft 4. The front forks 7 each include an upper outer tube 7a and a lower inner tube 7b retained in the upper outer tube 7a in an extendible and contractible manner. A front wheel 8 is rotatably attached to a lower end of the inner tube 7b. Extension and contraction of the front forks 7 cause vibration absorption of the front wheel 8. Moreover, a brake 10 is attached between the inner tube 7b and the front wheel 8 to provide braking rotation of the front wheel 8 via operation of the brake lever. A front fender 11 is retained on the inner tube 7b so as to move upward/downward along with the front wheel 8.

A fuel tank 15 and a sheet 16 are retained on an upper side of the main frame 2 in a back-and-forth relationship. An engine 17 and a transmission 18 are retained on the main frame 2 below the fuel tank 15. The transmission 18 includes a drive shaft 19 that outputs power generated in the engine 17. The drive shaft 19 is connected to a drive sprocket 20.

A swing arm 21 is swingingly retained on a lower end of the main frame 2. A driven sprocket 22 and a rear wheel 23 are rotatably retained on a rear end of the swing arm 21. A chain 24 is suspended between the drive sprocket 20 and the driven sprocket 22. The power generated in the engine 17 is transmitted to the rear wheel 23 via the transmission 18, the drive shaft 19, the drive sprocket 20, the chain 24, and the driven sprocket 22.

The two-wheeled motor vehicle 1 includes an evaluation apparatus 31. The evaluation apparatus 31 evaluates vehicle driving skills. The evaluation apparatus 31 is, for example, retained with the handle 5 directly or indirectly. The evaluation apparatus 31 may be detachably attached to the two-wheeled motor vehicle 1 with a holder not shown. The evaluation apparatus 31 is, for example, a smartphone.

Figure 2:
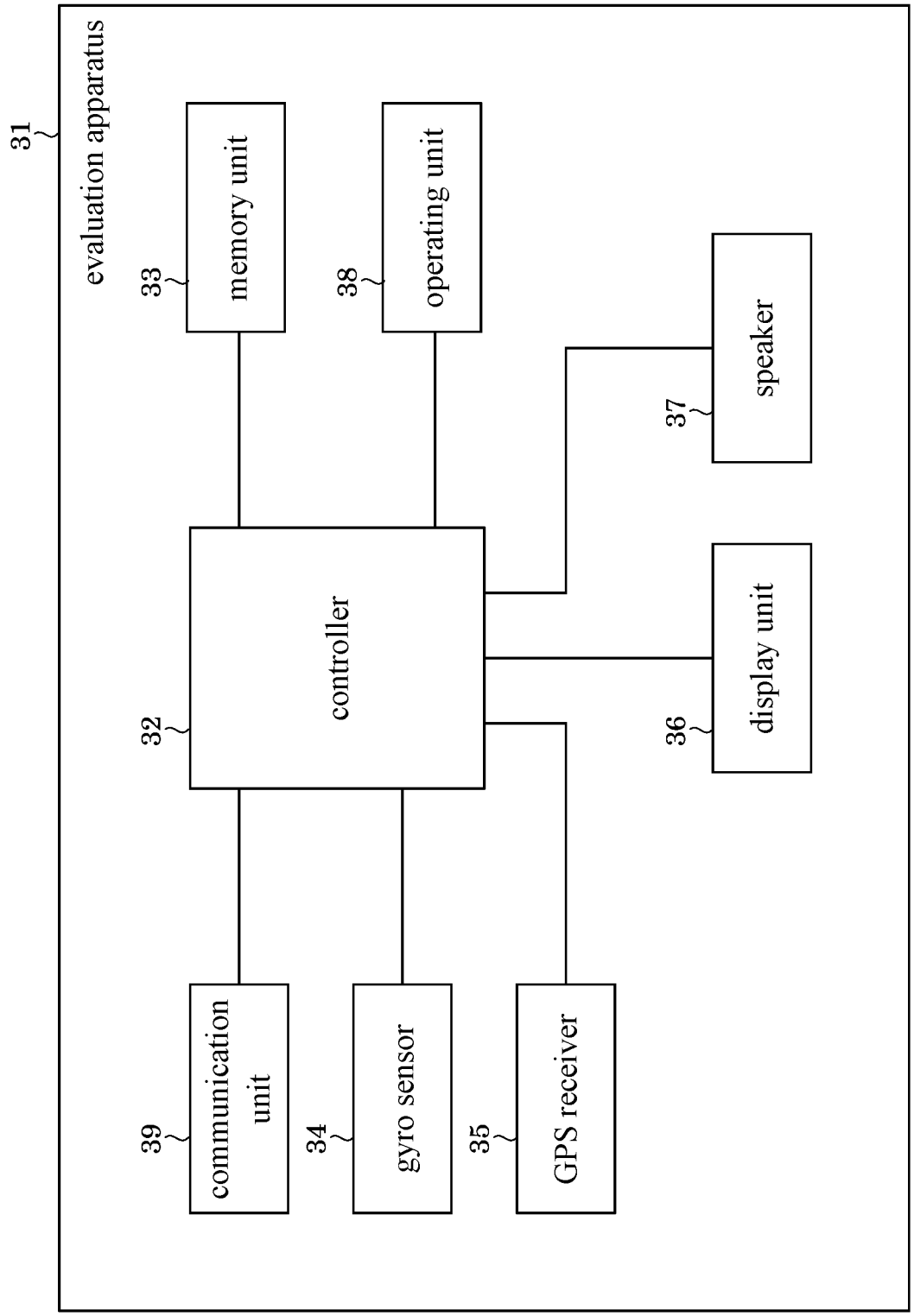
FIG. 2 is a block diagram illustrating an evaluation apparatus.

FIG. 2 illustrates the evaluation apparatus 31. The evaluation apparatus 31 includes a controller 32, a memory unit 33, a gyro sensor 34, a GPS (Global Positioning System) receiver 35, a display unit 36, a speaker 37, an operating unit 38, and a communication unit 39. The controller 32 is electrically connected to the memory unit 33, the gyro sensor 34, the GPS receiver 35, the display unit 36, the speaker 37, the operating unit 38, and the communication unit 39.

The controller 32 is, for example, a CPU (central processing unit). The controller 32 is configured or programmed to perform various processes in response to instructions of evaluation programs stored in the memory unit 33. The controller 32 is one example of the computer including in various preferred embodiments of the present invention.

Examples of the memory unit 33 include a ROM (read-only memory), a flash memory, and a RAM (random access memory). The memory unit 33 stores in advance the evaluation programs and various types of information. The memory unit 33 stores measured data. The memory unit 33 is used as a workspace in which the controller 32 performs processing.

The gyro sensor 34 measures a yaw rate, a roll rate, a pitch rate, a yaw angle, a roll angle, and a pitch angle of the two-wheeled motor vehicle 1. Here, the yaw rate, the roll rate, and the pitch rate each correspond to an angular speed of the two-wheeled motor vehicle 1 in a yaw direction, a roll direction, and a pitch direction, respectively. The yaw angle, the roll angle, and the pitch angle each correspond to an angle of the two-wheeled motor vehicle 1 in the yaw direction, the roll direction, and the pitch direction, respectively. These rates are each referred to below as a "vehicle angular speed" when the yaw rate, the roll rate, and the pitch rate of the two-wheeled motor vehicle 1 are not particularly distinguished. Similarly, these angles are each referred to as a "vehicle angle" when the yaw angle, the roll angle, and the pitch angle of the two-wheeled motor vehicle 1 are not particularly distinguished.

The GPS receiver 35 measures a position of the two-wheeled motor vehicle 1.

The gyro sensor 34 and the GPS receiver 35 are one example of the measuring unit according to various preferred embodiments of the present invention (more specifically, the measuring unit internal to the evaluation apparatus). Information on the vehicle angular speed, the vehicle angle, and the position of the two-wheeled motor vehicle 1 measured by the gyro sensor 34 or the GPS receiver 35 corresponds to the measured data on states of the two-wheeled motor vehicle 1. The information on the position of the two-wheeled motor vehicle 1 is referred to below as "positional information" as appropriate.

The display unit 36 is a display that indicates images. The speaker 37 outputs sound such as voices. The display unit 36 and the speaker 37 are one example of the output unit (more specifically, the output unit internal to the evaluation apparatus) in the present invention.

The operating unit 38 is, for example, a physical button or a button displayed on the display unit 36. The driver operates the operating unit 38 to receive various instructions.

The communication unit 39 communicates the information with a device external to the evaluation apparatus 31 by radio.

The evaluation programs may be distributed via a network. In this case, the evaluation programs can be downloaded from an external device (e.g., a server) via the communication unit 39. Moreover, the evaluation programs may be stored in the non-transitory computer readable storage medium. The non-transitory computer readable storage medium is a medium via which the computer can read the evaluation programs. Examples of the non-transitory computer readable storage medium include a DVD-ROM and a CD-ROM.

Figure 3:
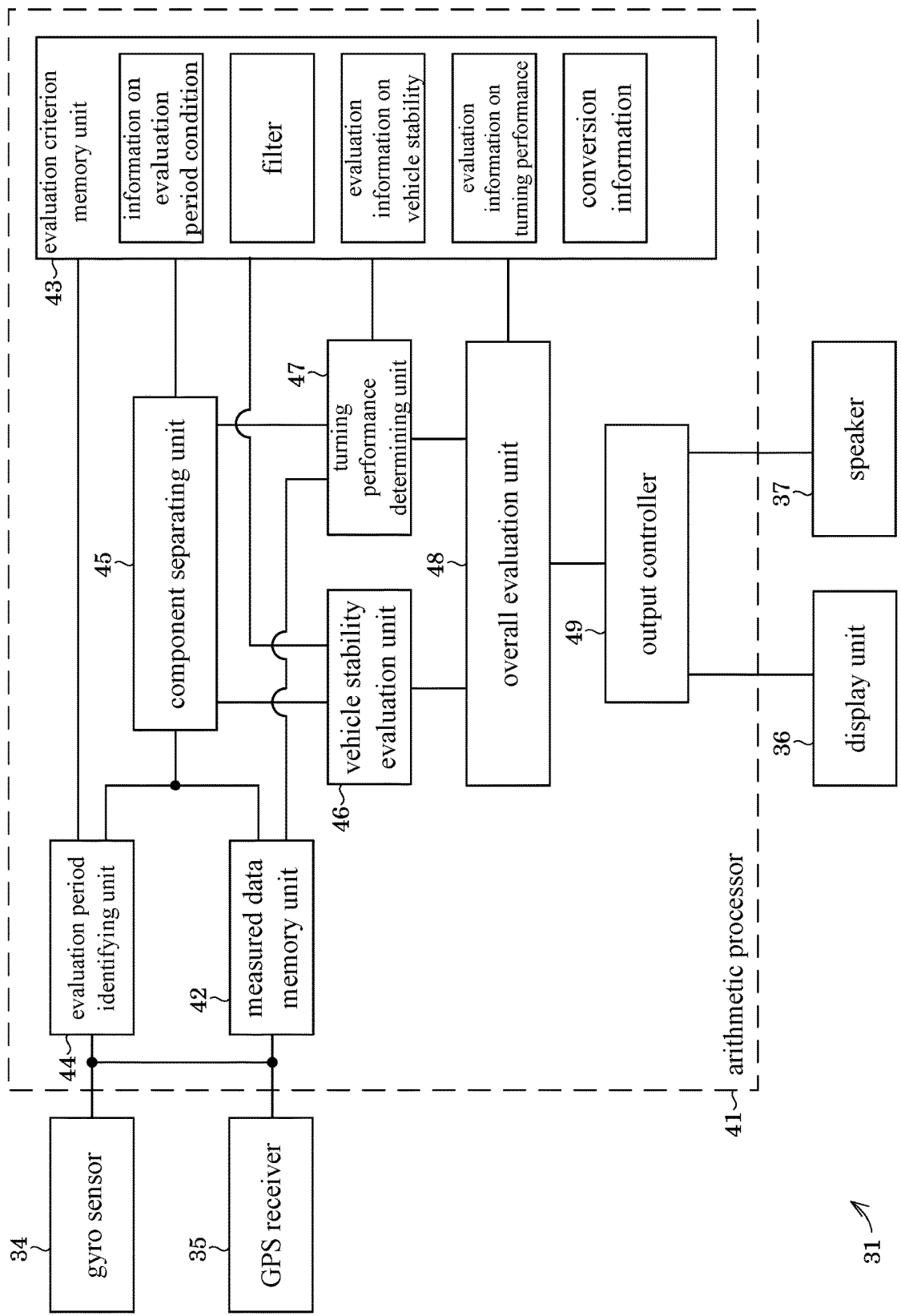
FIG. 3 is a functional block diagram of the evaluation apparatus.

FIG. 3 is a functional block diagram of the evaluation apparatus 31. The evaluation apparatus 31 includes an arithmetic processor 41. The arithmetic processor 41 is configured or programmed to be functionally divided into a measured data memory unit 42, an evaluation criterion memory unit 43, an evaluation period identifying unit 44, a component separating unit 45, a vehicle stability evaluation unit 46, a turning performance determining unit 47, an overall evaluation unit 48, and an output controller 49.

The measured data memory unit 42 and the evaluation criterion memory unit 43 are implemented by the memory unit 33. The evaluation period identifying unit 44, the component separating unit 45, the vehicle stability evaluation unit 46, the turning performance determining unit 47, the overall evaluation unit 48, and the output controller 49 are each implemented through a process performed by the controller 32 in response to the instructions of the evaluation programs.

The measured data memory unit 42 stores the measured data obtained by the gyro sensor 34 and the GPS receiver 35. The measured data stored in the measured data memory unit 42 is time-series data.

The evaluation criterion memory unit 43 stores information on an evaluation period condition, a filter, evaluation information on the vehicle stability, evaluation information on the turning performance, and the conversion information. The above information is individually set in advance prior to evaluation. The information is to be described in detail later upon description of the evaluation period identifying unit 44 and the like.

The evaluation period identifying unit 44 identifies an evaluation period for evaluating the driving skills for the two-wheeled motor vehicle 1 in accordance with the measured data. Here, the evaluation period is, for example, a turning-motion period during which the two-wheeled motor vehicle 1 turns. During the period, the turning motion is able to be defined appropriately. The following explanatorily describes a detailed process by the evaluation period identifying unit 44.

The evaluation period identifying unit 44 obtains time-series data on the yaw rate from the gyro sensor 34 or the measured data memory unit 42. The evaluation period identifying unit 44 obtains the minimum $X_t$ and the minimum duration $Y_{min}$ from the evaluation criterion memory unit 43. Then, the evaluation period identifying unit 44 identifies a period during which an absolute value of the yaw rate is equal to or more than the minimum $X_t$ over the minimum duration $Y_{min}$ or more as an evaluation period (turning-motion period) Y. Here, the minimum $X_t$ and the minimum duration $Y_{min}$ are one example of the information on the evaluation period condition.

The minimum $X_t$ and the minimum time duration $Y_{min}$ are set appropriately taking into consideration types of the two-wheeled motor vehicle 1. The evaluation period Y may be identified with the measured data on other than the yaw rate. For instance, the turning-motion period may be identified with the positional information obtained by the GPS receiver 35.

The component separating unit 45 extracts low-frequency components and high-frequency components from the measured data during the evaluation period.

The following describes a process by the component separating unit 45 taking a process of the roll rate as one non-limiting example. The component separating unit 45 obtains the time-series data on the roll rate over the evaluation period from the gyro sensor 34 or the measured data memory unit 42. Here, the time-series data on the roll rate preferably is entire frequency band data, for example. The component separating unit 45 reads a low-pass filter and a band-pass filter from the evaluation criterion memory unit 43. The low-pass filter and the band-pass filter are one non-limiting example of the filter.

The component separating unit 45 removes high frequency components higher than a given threshold frequency Fc1 from the entire frequency band data on the roll rate using the low-pass filter. This achieves obtainment of the low-frequency components of the roll rate during the evaluation period.

The component separating unit 45 removes low-frequency components equal to or lower than the threshold frequency Fc1 and noise components equal to higher than a given threshold frequency Fc2 (Fc2>Fc1) from the entire frequency band data on the roll rate using the band-pass filter. This achieves obtainment of the high-frequency components of the roll rate during the evaluation period.

The threshold frequencies Fc1 and Fc2 are set in accordance with types of the measured data to be processed and characteristics to be identified. For instance, the threshold frequency Fc1 may be set such that a difference thereof between a beginner and an expert becomes the maximum. Note that the threshold frequency Fc2 is necessarily higher than the threshold frequency Fc1.

The vehicle stability evaluation unit 46 evaluates the driving skills in terms of the vehicle stability based on the measured data.

For instance, an integral value of an absolute value of the low-frequency components for the vehicle angular speed increases and an integral value of an absolute value of the high-frequency components for the vehicle angular speed decreases as a driver operates (steers) the two-wheeled motor vehicle 1 smoothly during travelling. On the other hand, an integral value of an absolute value of the high-frequency components for the vehicle angular speed increases and an integral value of an absolute value of the low-frequency components for the vehicle angular speed decreases as the driver operates minutely and rapidly during the travelling. Accordingly, the driving skills in terms of the stability are evaluated based on a ratio between the integral value of the absolute value of the low-frequency components for the vehicle angular speed and the integral value of the absolute value of the high-frequency components for the vehicle angular speed. Especially, when the evaluation period corresponds to the turning-motion period, the driving skills in terms of the stability are likely to be reflected in the ratio described above.

The following describes detailed evaluation of the driving skills by the vehicle stability evaluation unit 46 based on the yaw rate, the roll rate, and the pitch rate.

The vehicle stability evaluation unit 46 obtains the low-frequency components and the high-frequency components of the yaw rate, the roll rate, and the pitch rate during the evaluation period from the component separating unit 45.

It is assumed that the ratio between the integral value of the absolute value of the low-frequency components and the integral value of the absolute value of the high-frequency components is a stability index S. The vehicle stability evaluation unit 46 calculates a stability index Syaw for the yaw rate, a stability index Sroll for the roll rate, and a stability index Spitch for the pitch rate. Moreover, the vehicle stability evaluation unit 46 calculates a weighted linear sum (referred to as a "vehicle stability score Sv") of the stability indexes Syaw, Sroll, and Spitch.

Functions and the like that calculate the stability indexes Syaw, Sroll, and Spitch and the vehicle stability score Sv are contained in the evaluation information on the vehicle stability. The vehicle stability evaluation unit 46 performs the above-described processing using the evaluation information on the vehicle stability read out from the evaluation criterion memory unit 43.

The vehicle stability evaluation unit 46 is one non-limiting example of the first evaluation unit according to a preferred embodiment of the present invention. The vehicle stability score Sv is one non-limiting example of the first evaluation result according to a preferred embodiment of the present invention. The evaluation information on the vehicle stability is one non-limiting example of the first evaluation criterion information according to a preferred embodiment of the present invention.

The turning performance evaluation unit 47 evaluates the driving skills from the measured data in terms of the turning performance. For instance, an integral value of the absolute value of the low-frequency components for the vehicle angle increases as a driver operates the two-wheeled motor vehicle 1 smoothly during travelling. Accordingly, the driving skills are able to be evaluated from the integral value of the absolute value of the low-frequency components for the vehicle angle in terms of the turning performance. Especially, when the evaluation period is a turning-motion period, the driving skills in terms of the turning performance are likely to be reflected in the integral value described above.

The following describes evaluation of the driving skills by the turning performance evaluation unit 47 based on the roll angle, the pitch angle, and the positional information.

The turning performance evaluation unit 47 obtains the low-frequency components for the roll angle and the pitch angle during the evaluation period from the component separating unit 45. The turning performance evaluation unit 47 obtains positional information on the two-wheeled motor vehicle 1 during the evaluation period from the measured data memory unit 42.

The turning performance evaluation unit 47 calculates an integral value (referred to as a "turning performance index Troll") of the absolute value of the low-frequency components for the roll angle. The turning performance evaluation unit 47 calculates an integral value (referred to as a "turning performance index Tpitch") of the absolute value of the low-frequency components for the pitch rate in the same manner. Moreover, the turning performance evaluation unit 47 calculates an average vehicle speed Tspeed during the evaluation period based on the positional information obtained from the measured data memory unit 42. The turning performance evaluation unit 47 also calculates a weighted linear sum (referred to as a "turning performance score Tv") of the turning performance indexes Troll, Tpitch and the average vehicle speed Tspeed.

Functions and the like to calculate the turning performance indexes $T_{roll}$, $T_{pitch}$, the average vehicle speed $T_{speed}$, and the turning performance score $T_v$ are contained in the evaluation information on the turning performance. Here, the evaluation information on the turning performance and the evaluation information on the vehicle stability define individual different evaluation criterions. The turning performance evaluation unit 47 performs the above-described processing using the evaluation information on the turning performance read out from the evaluation criterion memory unit 43.

The turning performance evaluation unit 47 is one non-limiting example of the second evaluation unit according to a preferred embodiment of the present invention. The turning performance score $T_v$ is one non-limiting example of the second evaluation result according to a preferred embodiment of the present invention. The evaluation information on the turning performance is one non-limiting example of the second evaluation criterion information according to a preferred embodiment of the present invention.

The overall evaluation unit 48 evaluates the driving skills overall. Specifically, an overall characteristic score G is obtained based on the vehicle stability score $S_v$ and the turning performance score $T_v$. The overall evaluation unit 48 is one non-limiting example of the overall evaluation unit according to a preferred embodiment of the present invention. The overall characteristic score G is one non-limiting example of the overall evaluation result according to a preferred embodiment of the present invention.

The overall evaluation unit 48 obtains the overall characteristic score G using the conversion information. The conversion information is stored in advance in the evaluation criterion memory unit 43. The conversion information defines the overall characteristic score G from the vehicle stability score $S_v$ and the turning performance score $T_v$. The following describes features of the conversion information.

When the vehicle stability score $S_v$ is lower than a threshold b, the conversion information defines the overall characteristic score G such that the overall characteristic score G decreases as the turning performance score $T_v$ increases.

The following is a formula describing the above.

That is, an overall characteristic score G based on the vehicle stability score $S_v$ and the turning performance score $T_v$ is denoted by "$G(S_v, T_v)$". When the scores Sv, $T_{vS}$, and $T_{vB}$ satisfy formulae (1) and (2), a formula (3) holds:

$$S_v < b \tag{1}$$

$$T_{vS} < T_{vB} \tag{2}$$

$$G(S_v, T_{vS}) \geq G(S_v, T_{vB}) \tag{3}$$

When the vehicle stability score $S_v$ is higher than the threshold b, the conversion information defines the overall characteristic score G such that the overall characteristic score G increases as the turning performance score $T_v$ increases.

That is, when the scores $S_v$, $T_{vS}$, and $T_{vB}$ satisfy formulae (4) and (5), a formula (6) holds:

$$S_v > b \tag{4}$$

$$T_{vS} < T_{vB} \tag{5}$$

$$G(S_v, T_{vS}) \leq G(S_v, T_{vB}) \tag{6}$$

The conversion information defines the overall characteristic score G such that the overall characteristic score G increases as the vehicle stability score $S_v$ increases.

That is, when the scores $S_{vS}$ and $S_{vB}$ satisfy a formula (7), a formula (8) holds:

$$S_{vS} < S_{vB} \tag{7}$$

$$G(S_{vS}, T_v) \leq G(S_{vB}, T_v) \tag{8}$$

Figure 4:
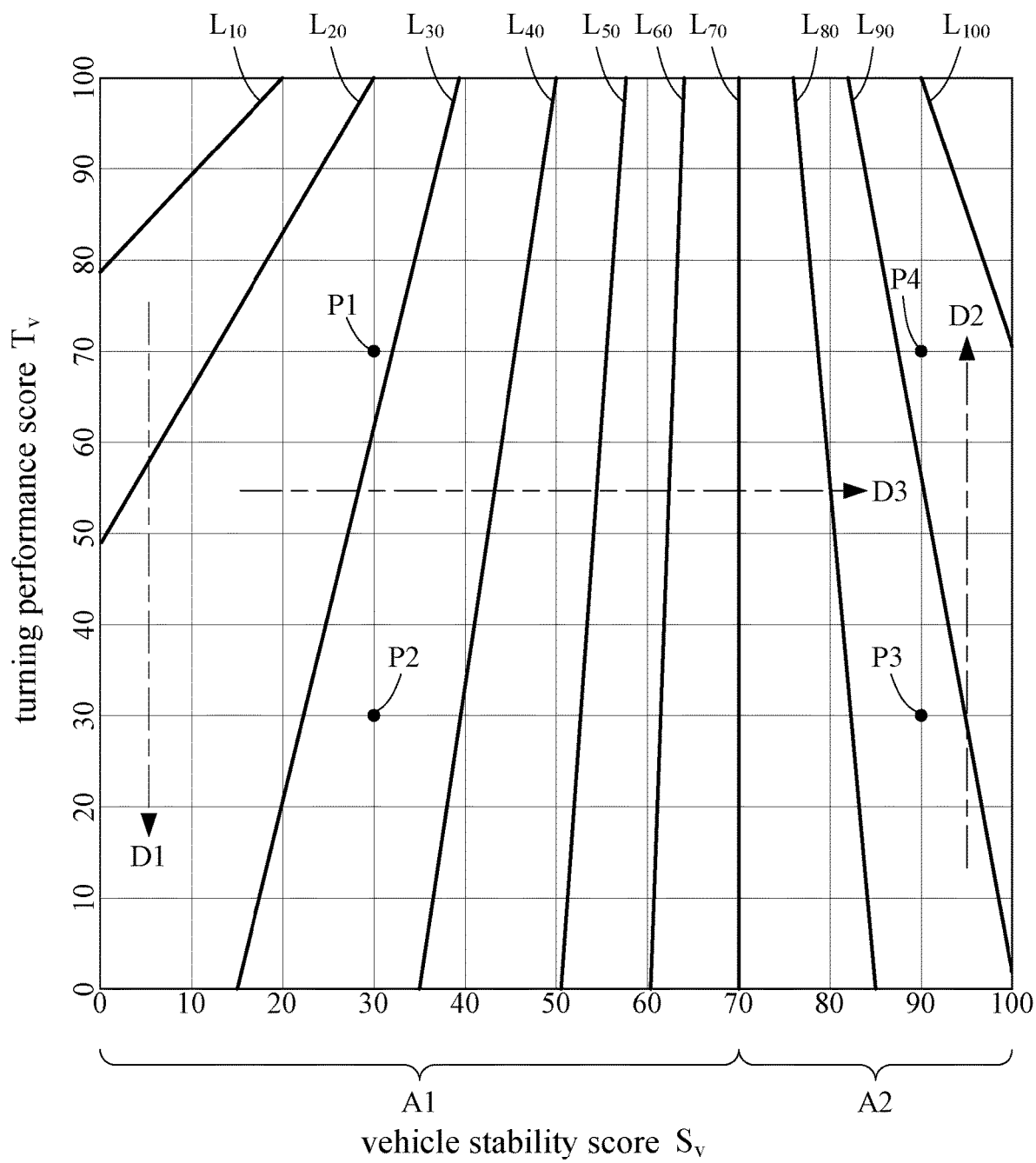
FIG. 4 schematically illustrates a relationship of scores defined with conversion information.

Reference is now made to FIG. 4. FIG. 4 schematically illustrates a relationship of the scores $S_v$, $T_v$, and G defined with the conversion information.

FIG. 4 illustrates a two-dimensional coordinate having a horizontal axis for the vehicle stability score $S_v$ and a longitudinal axis for the turning performance score $T_v$. In FIG. 4, the vehicle stability score $S_v$ and the turning performance score $T_v$ each take values in a range of 0 to 100 for convenience of explanation. Moreover, lines $L_{10}$, $L_{20}$, $L_{30}$, . . . , and $L_{100}$ connecting positions of the overall characteristic scores G of 10, 20, 30, . . . , and 100, respectively, are indicated on the two-dimensional coordinate. FIG. 4 illustrates the threshold b of 70.

In FIG. 4, values in a range of 10 to 20 are defined in a stepwise manner or successively as overall characteristic scores G in a region enclosed with the lines $L_{10}$ and $L_{20}$. The same is applied to regions enclosed with other adjacent lines L.

It is apparent from the drawing that a relationship of the scores $S_v$, $T_v$, and G differs between a region A1 having the vehicle stability score $S_v$ of less than 70 and a region A2 having the vehicle stability score $S_v$ of more than 70. The following described in detail the relationship of the scores $S_v$, $T_v$, and G using a point Pi ($S_v$, $T_v$) on a $S_v$-$T_v$ coordinate and an overall characteristic score G (Pi) at the point Pi. The overall characteristic score G (Pi) is abbreviated to a "score G (Pi)" appropriately.

Comparison is made between a point P1 (30, 70) and a point P2 (30, 30). A score G (P1) at the point P1 falls within a range of 20 to 30. A score G (P2) at the point P2 falls within a range of 30 to 40. Accordingly, the score G (P1) is lower than the score G(P2). As noted above, the conversion information in FIG. 4 has the first feature.

The first feature causes the turning performance score $T_v$ to be a point-deduction element that decreases the overall characteristic score G in the region A1. In the region A1, when the point P moves in a direction D1 (i.e., when the turning performance score $T_v$ decreases), the score G increases.

Then comparison is made between a point P3 (90, 30) and a point P4 (90, 70). A score G (P3) at the point P3 falls within a range of 80 to 90. A score G (P4) at the point P4 falls within a range of 90 to 100. Accordingly, the score G (P4) is higher than the score G(P3). As noted above, the conversion information in FIG. 4 has the second feature.

The second feature causes the turning performance score $T_v$ to be a point-addition element that increases the overall characteristic score G in the region A2. In the region A2, when the point P moves in a direction D2 (i.e., when the turning performance score $T_v$ increases), the score G increases.

Then comparison is made between the pint P1 and the point P4. The score G (P4) is higher than the score G (P1). Another comparison is made between the points P2 and P3. The score G (P3) is higher than the score G (P1). As noted above, the conversion information in FIG. 4 has the third feature.

The third feature causes the vehicle stability score $S_v$ to be a point-addition element that increases the overall characteristic score G throughout the regions A1 and A2. That is, when the point P moves in a direction D3 (i.e., when the vehicle stability score $S_v$ increases), the score G increases.

The $S_v$-$T_v$ coordinate may contain a region having the same overall characteristic score G. For instance, the score G may be equal among a plurality of adjoining or adjacent points P. The following describes this in more detail.

As in the formula (3), the score $G(S_v, T_{vS})$ may be equal to the score $G(S_v, T_{vB})$. For instance, comparison is made between a point P5 (30, 31), not shown, and the point P2 (30, 30). At this time, a score G(P5) may be equal to the score G(P2). The feature that the score G (P5) is equal to the score G (P2) is not contradictory to the first feature.

Moreover, as in the formula (6), the score G ($S_v$, $T_{vS}$) may be equal to the score G ($S_v$, $T_{vB}$). For instance, comparison is made between a point P6 (90, 31), not shown, and the point P3 (90, 30). At this time, a score G (P6) may be equal to the score G (P3). The feature that the score G (P6) is equal to the score G (P3) is not contradictory to the second feature.

Moreover, as in the formula (9), the score G ($S_{vS}$, $T_v$) may be equal to the score G ($S_{vB}$, $T_v$). For instance, comparison is made between a point P7 (31, 30), not shown, and a point P2 (30, 30). At this time, a score G (P7) may be equal to the score G (P3). The feature that the score G (P7) is equal to the score G (P2) is not contradictory to the third feature.

Specifically, the conversion information mentioned above is implementable with the conversion map, the conversion function, and the like. The following explanatorily describes the conversion map and the conversion function.

Reference is now made to FIG. 5. FIG. 5 is one non-limiting example of the conversion map. In FIG. 5, the vehicle stability score $S_v$ and the turning performance score $T_v$ each take a value in a range of 0 to 100 for convenience of explanation.

As illustrated, the conversion map is matrix data having the vehicle stability score $S_v$, the turning performance score $T_v$, and the overall characteristic score G associated with one another. Numbers 0 to 100 are assigned individually for every column as a value of the vehicle stability score $S_v$.

Moreover, numbers 0 to 100 are assigned individually for every row as a value of the turning performance score $T_v$. Each cell where the column and the row intersect contains an assigned value of the overall characteristic score G associated with the vehicle stability score $S_v$ and the turning performance score $T_v$. That is, the overall characteristic score G is determined uniquely from a combination of the vehicle stability score $S_v$ and the turning performance score $T_v$.

The conversion map is generated empirically or experimentally, for example. The threshold b is also set appropriately. When the conversion map is used, the overall evaluation unit 48 reads the conversion map from the evaluation criterion memory unit 43. The overall evaluation unit 48 identifies the overall characteristic score G associated with the vehicle stability score $S_v$ and the turning performance score $T_v$ with reference to the read-out conversion map.

The following explanatorily describes the conversion function.

$$G(S_v, T_v) = k1*S_v + k2 + k3*T_v*(S_v - b) \quad (9)$$

Note that the threshold b, and the coefficients k1 and k2 satisfy a formula (10):

$$b*k1 + k2 = G(b, T_v) \quad (10)$$

As in the formula (9), the conversion function is a function of the overall evaluation score G having the vehicle stability score $S_v$ and the turning performance score $T_v$ as variables. The threshold b and the coefficients k1, k2, and k3 are settable appropriately as long as these satisfy the formula (10).

In the formula (10), G (b, $T_v$) denotes an overall characteristic score G with the vehicle stability score $S_v$ of b and the turning performance score $T_v$ of any values. The G (b, $T_v$) satisfying the formula (10) is a constant. That is, the conversion information in the formula (9) has a fourth feature.

When the vehicle stability score $S_v$ is the threshold b, the conversion information defines the overall characteristic score G such that the overall characteristic score G is constant.

Formulae (11) and (12) are each a detailed example of the conversion function.

$$G(S_v, T_v) = 0.6*S_v + 28 + 0.004*T_v*(S_v - 70) \quad (11)$$

$$G(S_v, T_v) = 0.6*S_v + 29 + 0.00483*T_v*(S_v - 60) \quad (12)$$

The formula (11) contains the threshold b of 70 and G (b, $T_v$) of 70. The formula (12) contains the threshold b of 60 and G (b, $T_v$) of 65.

Figure 6:
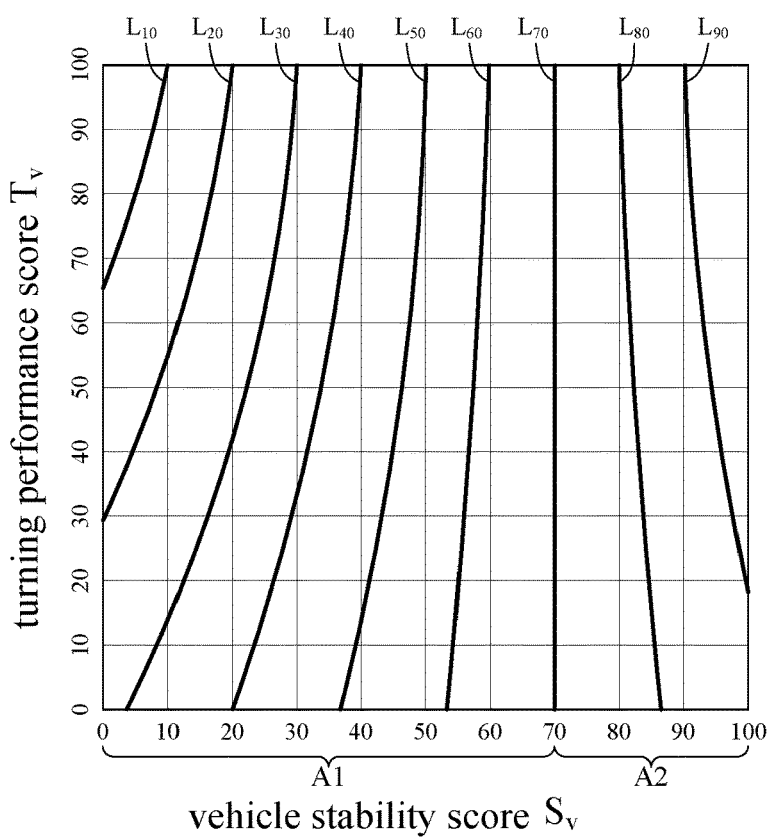
FIG. 6 schematically illustrates a relationship of scores defined with conversion information.
Figure 7:
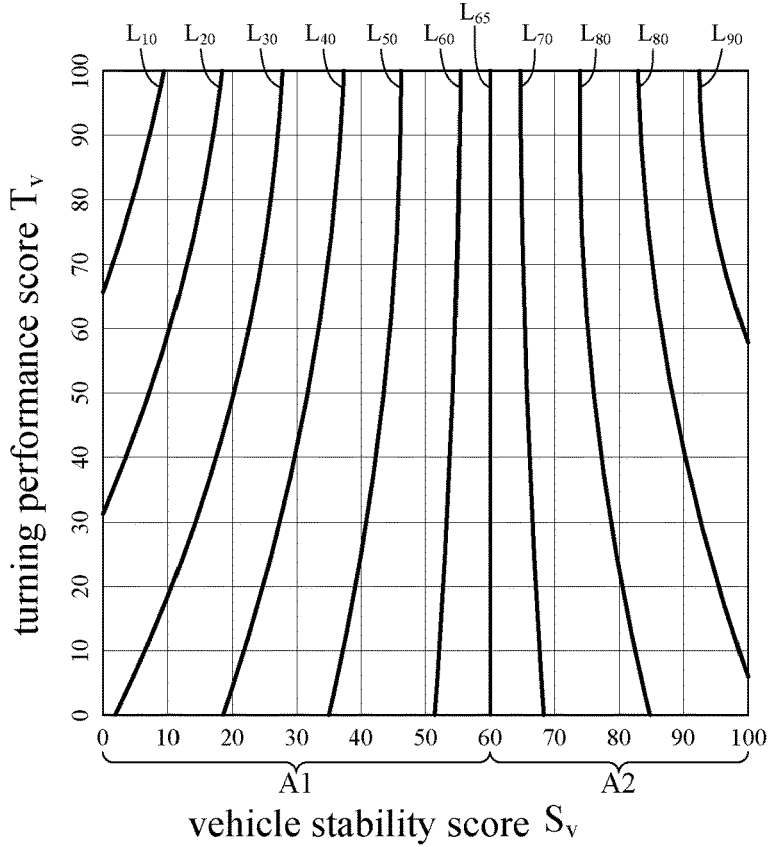
FIG. 7 schematically illustrates a relationship of scores defined with conversion information.

Reference is made to FIGS. 6 and 7. FIG. 6 schematically illustrates a relationship of the scores $S_v$, $T_v$, and G defined by the conversion function in the formula (11). FIG. 7 schematically illustrates a relationship of the scores $S_v$, $T_v$, and G defined by the conversion function in the formula (12). FIGS. 6 and 7 each illustrate a horizontal axis for the vehicle stability score $S_v$ and a longitudinal axis for the turning performance score $T_v$. Moreover, lines $L_{10}$, $L_{20}$, $L_{30}$, . . . , and $L_{100}$ connecting positions of the overall characteristic score G of 10, 20, 30, . . . , and 100, respectively, are indicated on the two-dimensional coordinate.

As illustrated in FIGS. 6 and 7, regions A1 and A2 differ from each other in direction in which the lines L incline. That is, the regions A1 and A2 differ from each other in relationship among the scores $S_v$, $T_v$, and G. The first feature is indicated in the region A1. The second feature is indicated in the region A2. The third feature is indicated throughout the regions A1 and A2.

In FIG. 6, a line $L_{70}$ is vertical. In FIG. 7, a line $L_{65}$ is vertical. That is, the overall characteristic score G is constant with the stability score $S_v$ of b. The fourth feature is indicated with the stability score $S_v$ of b.

The conversion function is generated empirically or experimentally. The threshold b is also set appropriately. When the conversion function is used, the overall evaluation unit 48 reads the conversion function from the evaluation criterion memory unit 43. The overall evaluation unit 48 calculates the overall characteristic score G by substituting the vehicle stability score $S_v$ and the turning performance score $T_v$ into the read-out conversion function.

Both the conversion map and the conversion function may be used. In this case, a final overall characteristic score G may be obtained based on an overall characteristic score GM obtained with the conversion map and an overall characteristic score GF obtained with the conversion function. Here, the final overall characteristic score G may be used as an average value of the overall characteristic scores GM and GF. Alternatively, the final overall characteristic score G may be used as higher or lower one of the overall characteristic scores GM and GF.

The output controller 49 conveys the overall characteristic score G to at least either the display unit 36 or the speaker 37. The overall characteristic score G is sent to the display unit 36 in the form of information transmittable to the driver visually. The overall evaluation result is sent to the speaker 37 in the form of information transmittable to the driver auditorily.

Figure 8:
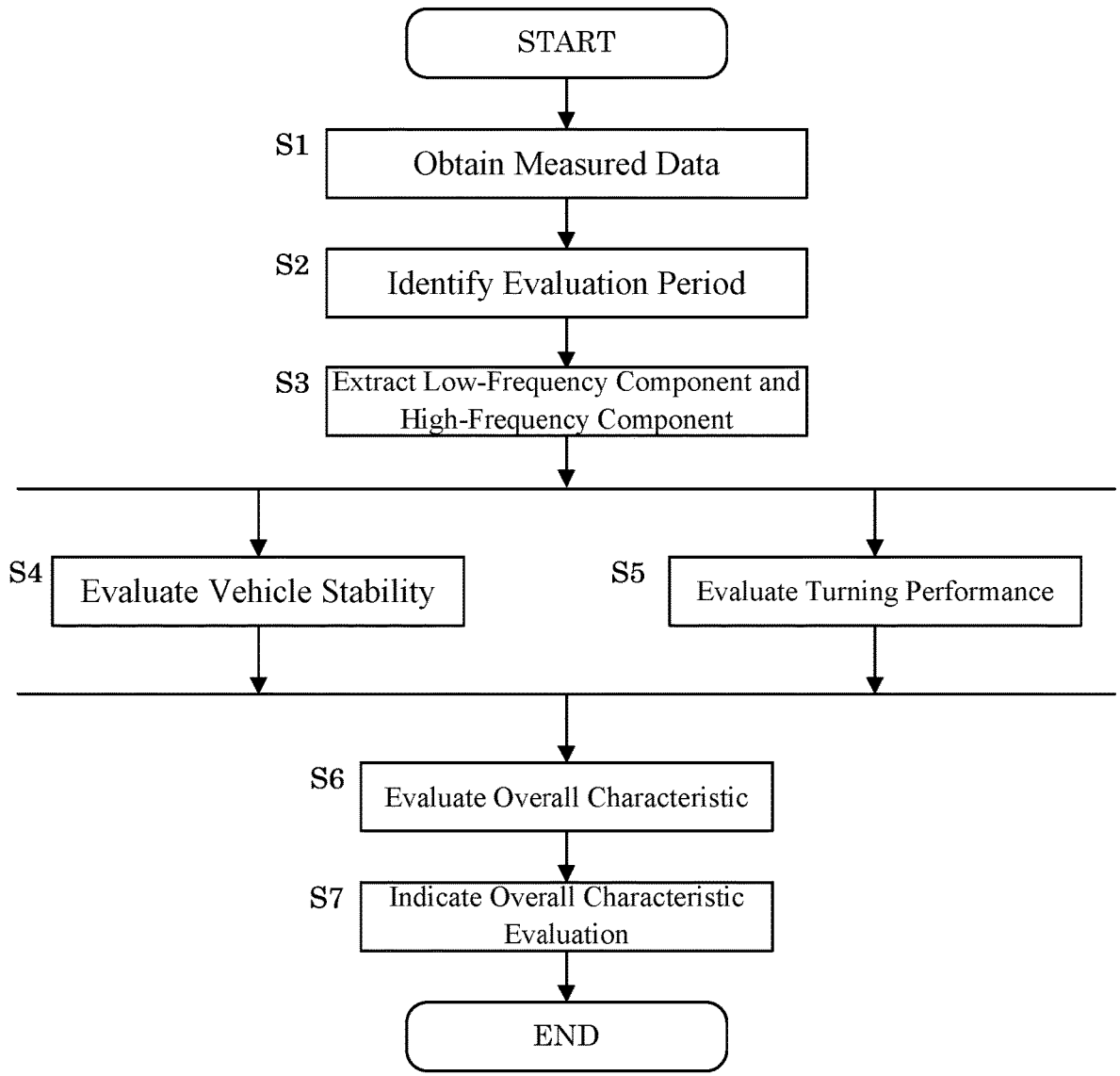
FIG. 8 is a flow chart of procedures of evaluating vehicle driving skills.

The following describes a non-limiting example of evaluation of the vehicle driving skills in the present preferred embodiment. FIG. 8 is a flow chart illustrating procedures of the non-limiting example of evaluating the driving skills. It is assumed that the evaluation programs are already actuated and the controller 32 is configured or programmed to perform various processes based on instructions of the evaluation programs.

<Step S1> Obtaining Measured Data

The driver drives the two-wheeled motor vehicle 1. The gyro sensor 34 and the GPS receiver 35 measure a vehicle state to obtain various types of measured data. The gyro sensor 34 and the GPS receiver 35 transmit the obtained measured data to the arithmetic processor 41. The measured data memory unit 42 stores the measured data.

<Step S2> Identifying Evaluation Period

The evaluation period identifying unit 44 identifies an evaluation period to evaluate the driving skills based on the measured data. The evaluation period identifying unit 44 uses information on the evaluation period condition read out from the evaluation criterion memory unit 43 to identify the evaluation period.

<Step S3> Extracting Low-Frequency Component and High-Frequency Component

The component separating unit 45 extracts low-frequency components and high-frequency components from the measured data during the evaluation period. The component separating unit 45 uses the filters read out from the evaluation criterion memory unit 43 for extracting the low-frequency components and the high-frequency components.

<Step S4> Evaluating Vehicle Stability

The vehicle stability evaluation unit 46 evaluates the vehicle driving skills in terms of the vehicle stability based on the measured data during the evaluation period. Specifically, the vehicle stability evaluation unit 46 obtains the vehicle stability score $S_v$ based on the low-frequency components and the high-frequency components of the vehicle angular speed during the evaluation period. The vehicle stability evaluation unit 46 uses the evaluation information on the vehicle stability read out from the evaluation criterion memory unit 43 to obtain the vehicle stability score $S_v$.

<Step S5> Evaluating Turning Performance

The turning performance evaluation unit 47 evaluates the vehicle driving skills in terms of the turning performances based on the measured data during the evaluation period. Specifically, the turning performance evaluation unit 47 obtains the turning performance score $T_v$ based on the low-frequency components of the vehicle angle during the evaluation period and an average vehicle speed $T_{speed}$ during the evaluation period. The turning performance evaluation unit 47 uses the evaluation information on the turning performance read out from the evaluation criterion memory unit 43 to obtain the turning performance score $T_v$.

<Step S6> Evaluating Overall Characteristic

The overall evaluation unit 48 evaluates the vehicle driving skills overall in terms of the vehicle stability and the turning performance based on the vehicle stability score $S_v$ and the turning performance score $T_v$. Specifically, the overall evaluation unit 48 obtains the overall characteristic score G. The overall evaluation unit 48 uses the conversion information read out from the evaluation criterion memory unit 43 to obtain the overall characteristic score G.

<Step S7> Indicating Overall Characteristic Evaluation

The output controller 49 transmits the overall characteristic score G to the display unit 36. The output controller 49 also transmits the vehicle stability score $S_v$ and the turning performance score $T_v$ to the display unit 36. The display unit 36 displays the scores G, $S_v$, and $T_v$.

Figure 9:
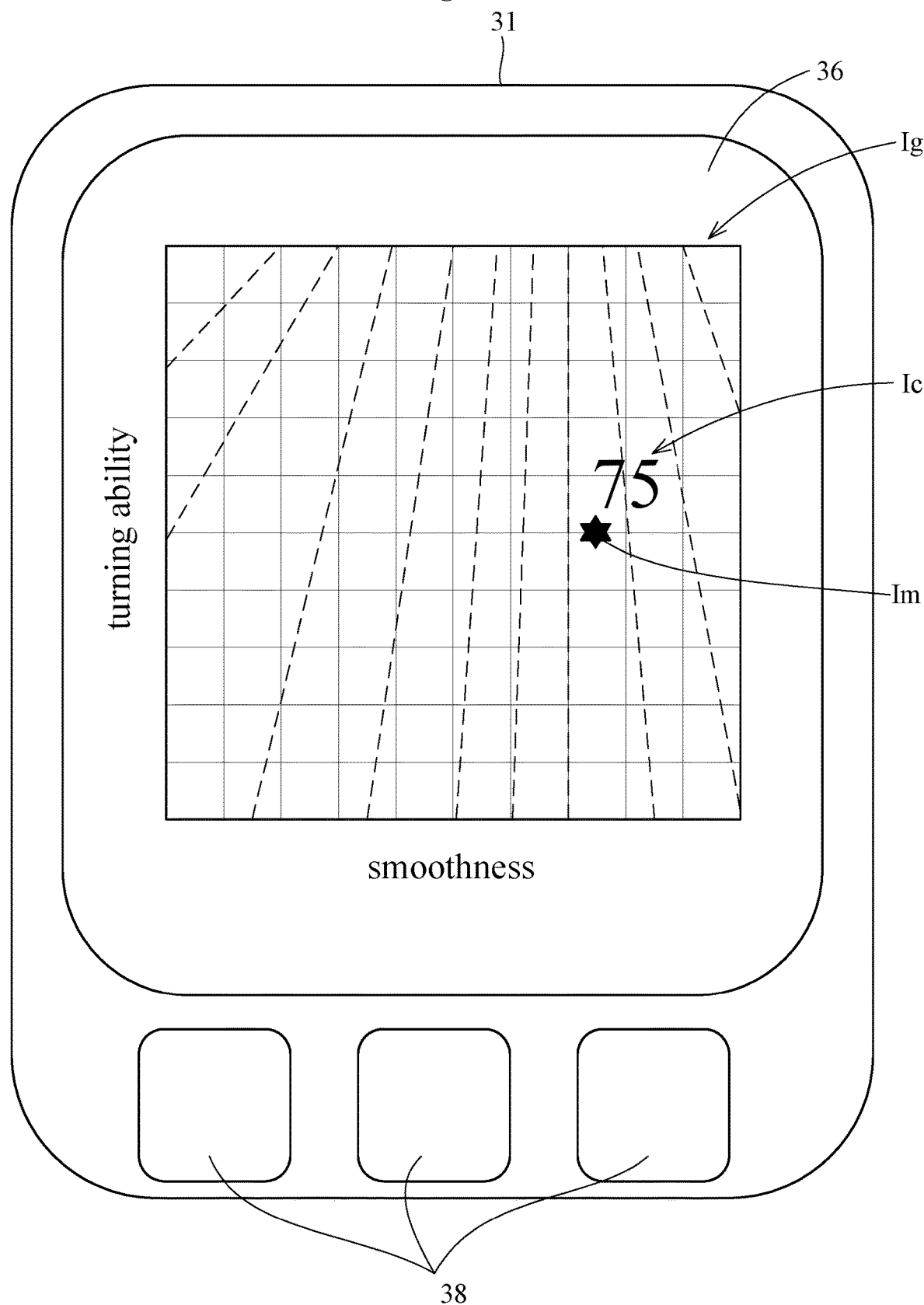
FIG. 9 illustrates a screen of a display unit.

Reference is made to FIG. 9. FIG. 9 illustrates a screen of the display unit 36.

As illustrated, the display unit 36 displays a character Ic indicating the overall characteristic score G. Here, the character Ic is, for example, a number such as "75". Moreover, the display unit 36 displays a graph Ig having a two-dimensional coordinate with a horizontal axis and a longitudinal axis. The graph Ig contains a plotted position whose coordinate in the horizontal axis corresponds to the vehicle stability score $S_v$ and whose coordinate in the longitudinal axis corresponds to the turning performance score $T_v$. FIG. 9 clearly indicates the position by a mark Im. In FIG. 9, the graph Ig also indicates "smoothness" along the horizontal axis thereof. As noted above, another expression easy for the driver to understand may be adopted instead of the vehicle stability. Similarly, the graph Ig indicates a "turning ability" along the longitudinal axis. As noted above, another expression easy for the driver to understand may be adopted instead of the turning performance.

Moreover, the display unit 36 may clearly indicate the graph Ig in various colors so as to distinguish between a region having a higher overall characteristic score G and a region having a lower overall characteristic score G on the graph Ig. Moreover, the display unit 36 may change the colors depending on the values of the overall characteristic scores G. For instance, colors for the character Ic and the mark Im indicating the overall characteristic score G are variable depending on the values of the overall characteristic score G.

The output controller 49 also transmits the overall characteristic score G to the speaker 37. The speaker 37 output sound as which the overall characteristic score G is read.

As noted above, according to one of the various preferred embodiments of the present invention, the overall evaluation unit 48 with the conversion information suitably obtains the overall characteristic score G from the vehicle stability score $S_v$ and the turning performance score $T_v$.

The conversion information preferably includes the first feature. Accordingly, when the vehicle stability score $S_v$ is lower than the threshold b, the overall evaluation score G decreases as the turning performance score $T_v$ increases. This allows the driver to be given a message to require suppression of the second evaluation result if the vehicle stability score $S_v$ is lower than the threshold b.

The conversion information preferably includes the second feature mentioned above. Accordingly, if the vehicle stability score $S_v$ is higher than the threshold b, the overall evaluation score G increases as the turning performance score $T_v$ increases. This allows the driver to be given a message to require enhancement of the turning performance score $T_v$ if the vehicle stability score $S_v$ is higher than the threshold b.

As noted above, guidelines different from one another depending on the vehicle stability score $S_v$ are applicable to the driver via the overall characteristic score G. This achieves enhanced driving skills by the step of suppressing the turning performance score $T_v$ and the step of enhancing the turning performance score $T_v$.

The conversion information preferably includes the third feature mentioned above. Accordingly, the overall evaluation score G increases as the vehicle stability score $S_v$ increases regardless of the turning performance score $T_v$. This allows the driver to be given a message to require enhancement of the vehicle stability score $S_v$.

Especially, when the vehicle stability score $S_v$ is lower than the threshold b, a message is applicable to the driver to require selective enhancement of only the vehicle stability score $S_v$. As a result, a course (curriculum) of enhancing the driving skills established by the process of suppressing the turning performance score $T_v$ and selectively enhancing only the vehicle stability score $S_v$ and the process of enhancing both the vehicle stability score $S_v$ and the turning performance score $T_v$.

Since the conversion information is at least either the conversion map or the conversion function, the overall evaluation unit 48 obtains the overall characteristic score G suitably. The conversion information including the first to third features mentioned above are able to be implemented suitably even with either the conversion map or the conversion function.

The evaluation apparatus 31 includes the output controller 49. Accordingly, the overall characteristic score G is indicated to the driver suitably via at least either the display unit 36 or the speaker 37.

The evaluation apparatus 31 includes the display unit 36. Accordingly, the overall characteristic score G is indicated to the driver visually. Moreover, the display unit 36 provided internal to the evaluation apparatus 31 achieves smooth indication of the overall characteristic score G.

The evaluation apparatus 31 includes the speaker 37. Accordingly, the overall characteristic score G is indicated to the driver auditorily. Moreover, the speaker 37 provided internal to the evaluation apparatus 31 achieves smooth indication of the overall characteristic score G.

The evaluation apparatus 31 includes the gyro sensor 34 and the GPS receiver 35. Accordingly, the state of the two-wheeled motor vehicle 1 is suitably detectable. Moreover, the gyro sensor 34 and the GPS receiver 35 provided internal to the evaluation apparatus 31 achieve smooth evaluation of the vehicle driving skills.

Preferred Embodiment 2

The following describes Preferred Embodiment 2 of the present invention with reference to drawings. The present Preferred Embodiment 2 discloses an evaluation system preferably including an evaluation apparatus 53, a measuring unit external to the evaluation apparatus 53, and the like. Like numerals are used to identify like components which are the same as in Preferred Embodiment 1 and will not particularly be described.

Figure 10:
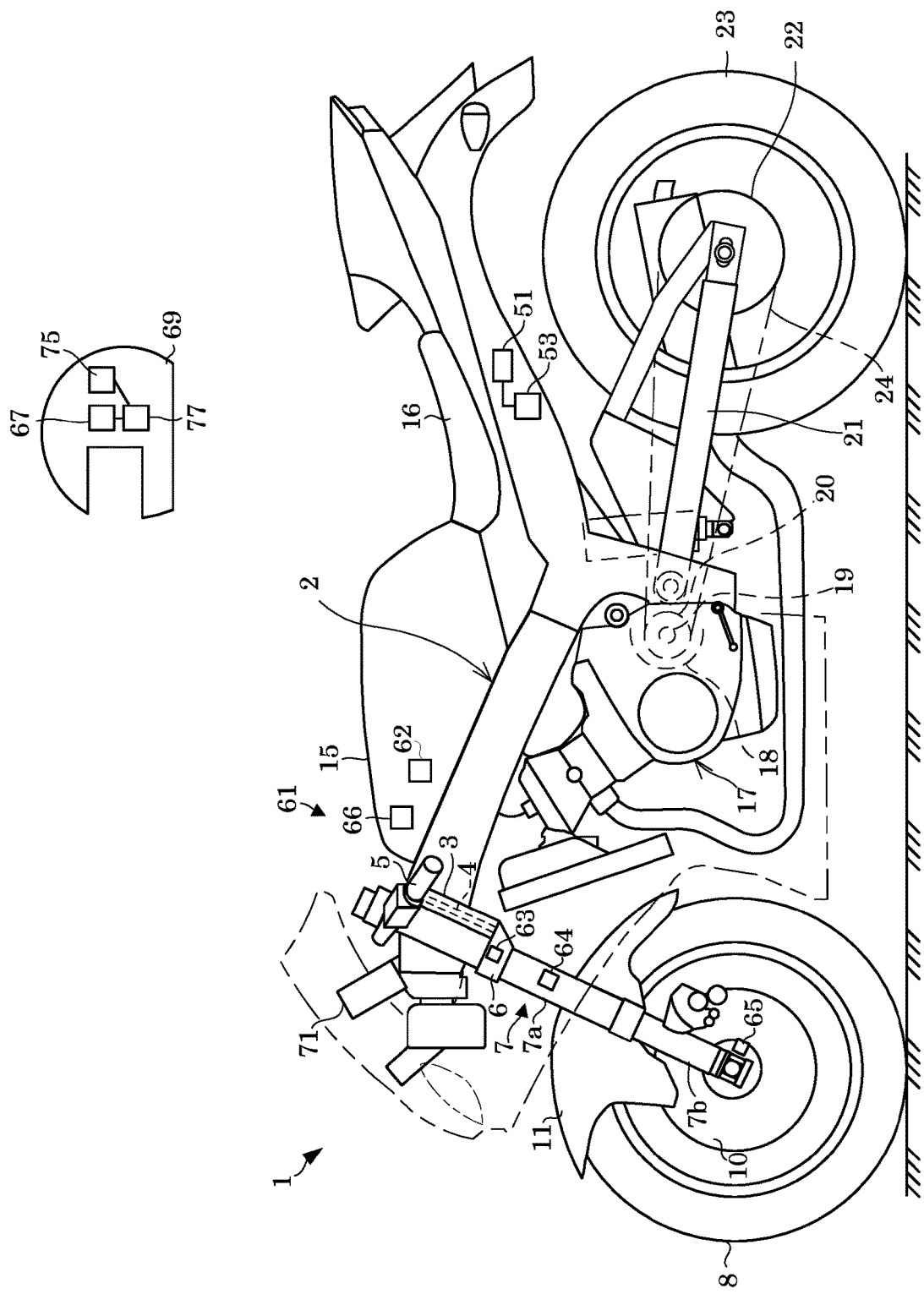
FIG. 10 is a side view illustrating an outline construction of a two-wheeled motor vehicle according to Preferred embodiment 2 of the present invention.

Reference is made to FIG. 10. FIG. 10 is a side view illustrating an outline construction of a two-wheeled motor vehicle according to another preferred embodiment of the present preferred embodiment.

The two-wheeled motor vehicle 1 includes an ECU (Electronic Control Unit) 51 and an evaluation apparatus 53. The ECU 51 and the evaluation apparatus 53 are disposed below the sheet 16. The ECU 51 controls operation of units of the two-wheeled motor vehicle 1.

The two-wheeled motor vehicle 1 includes a measuring unit 61. The measuring unit 61 is external to the evaluation apparatus 53. The measuring unit 61 includes a vehicle gyro sensor 62, a steering angle sensor 63, a stroke sensor 64, a wheel speed sensor 65, a GPS receiver 66, and a head gyro sensor 67. These sensors 62, 63, 64, 65, and 66 each obtain various types of measured data on a vehicle state. The head gyro sensor 67 obtains measured data on a driver state. The following describes the above in detail.

The vehicle gyro sensor 62 is, for example, disposed on the fuel tank 15. The vehicle gyro sensor 62 measures vehicle angular speeds and vehicle angles around yaw-, roll-, and pitch-axes of the two-wheeled motor vehicle 1.

The steering angle sensor 63 is, for example, disposed on an upper end of the front fork 7. The steering angle sensor 63 measures the steering angle. The steering angle corresponds to a rotation angle of the steering shaft 4.

The stroke sensor 64 is, for example, disposed on the front fork 7. The stroke sensor 64 measures an expansion/contraction amount of the front fork 7. The stroke sensor 64 calculates a caster angle of the front fork 7 based on the expansion/contraction amount. When the front fork 7 expands/contracts due to a hydraulic suspension, the stroke sensor 64 may calculate the caster angle by measuring hydraulic pressure of the suspension.

The wheel speed sensor 65 is disposed on the front wheel 8. The wheel speed sensor 65 detects a rotation speed of the front wheel 8. The wheel speed sensor 65 also calculates a vehicle speed of the two-wheeled motor vehicle 1 based on the rotation speed.

The GPS receiver 66 is, for example, disposed on the fuel tank 15. The GPS receiver 66 measures a position of the two-wheeled motor vehicle 1.

The head gyro sensor 67 is attached to a helmet 69 that the driver wears. The head gyro sensor 67 measures a yaw rate, a roll rate, a pitch rate, a yaw angle, a roll angle, and a pitch angle of the drive's head. When the yaw rate, the roll rate, and the pitch rate of the head are not particularly distinguished, they are referred to as a "head angular speed". When the yaw angle, the roll angle, and the pitch angle of the head are not particularly distinguished, they are referred to as a "head angle".

The two-wheeled motor vehicle 1 includes a monitor 71 that displays images. The monitor 71 is, for example, disposed in front of the handle 5. The monitor 71 may be an information terminal such as a smartphone.

The two-wheeled motor vehicle 1 includes a speaker 75. The speaker 75 is attached to the helmet 69. Instead of the speaker 75, headphones are adoptable. The helmet 69 further includes a helmet communication unit 77 attached thereto. The helmet communication unit 77 is electrically connected to the speaker 75 and the head gyro sensor 67.

Figure 11:
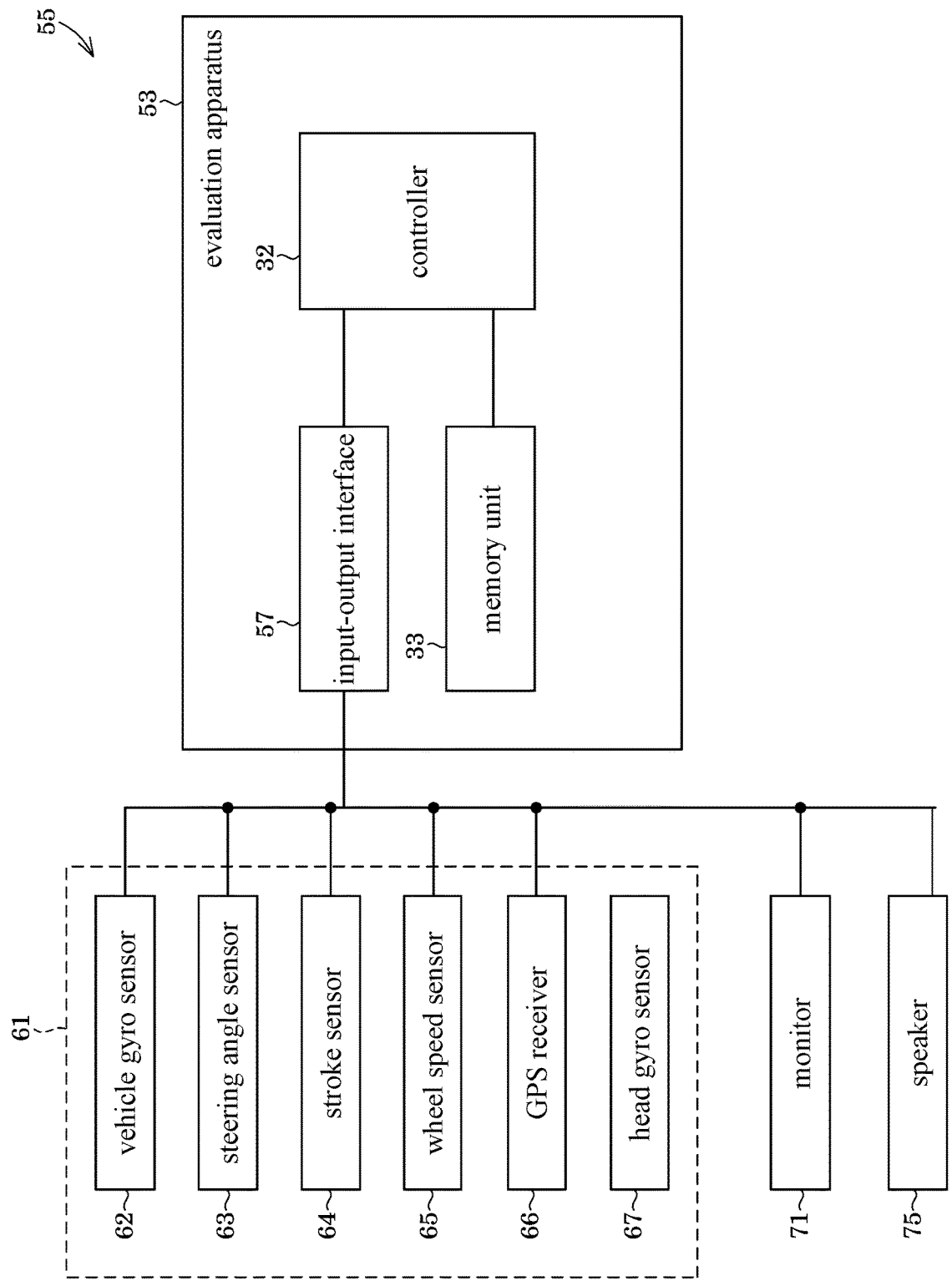
FIG. 11 is a block diagram of an evaluation system.

The evaluation apparatus 53, the measuring unit 61, the monitor 71, and the speaker 75 mentioned above preferably constitute an evaluation system 55 (see FIG. 11). The monitor 71 and the speaker 75 are each an example of the output unit (more particularly, the output unit external to the evaluation apparatus 53) in the present preferred embodiment of the present invention.

FIG. 11 illustrates a configuration of the evaluation system 55. The evaluation apparatus 53 includes the controller 32, the memory unit 33, and an input-output interface 57. The controller 32, the memory unit 33, and the input-output interface 57 are preferably connected by a bus, for example.

The input-output interface 57 is, for example, a USB interface, a wired LAN interface, a wireless LAN interface, and a Bluetooth (Registered Trademark) interface. The input-output interface 57 is connected to the measuring unit 61 in a wired or wireless manner. The input-output interface 57 receives the measured data measured by the measuring unit 61. The input-output interface 57 may be connected to the ECU 51. In this case, the input-output interface 57 obtains the measured data from the ECU 51.

The input-output interface 57 is connected to the monitor 71 in a wire or wireless manner. The input-output interface 57 is also connected to the head gyro sensor 67 and the speaker 75 via a helmet communication unit 77. Moreover, the evaluation programs may be installed in the evaluation apparatus 53 via the input-output interface 57.

Figure 12:
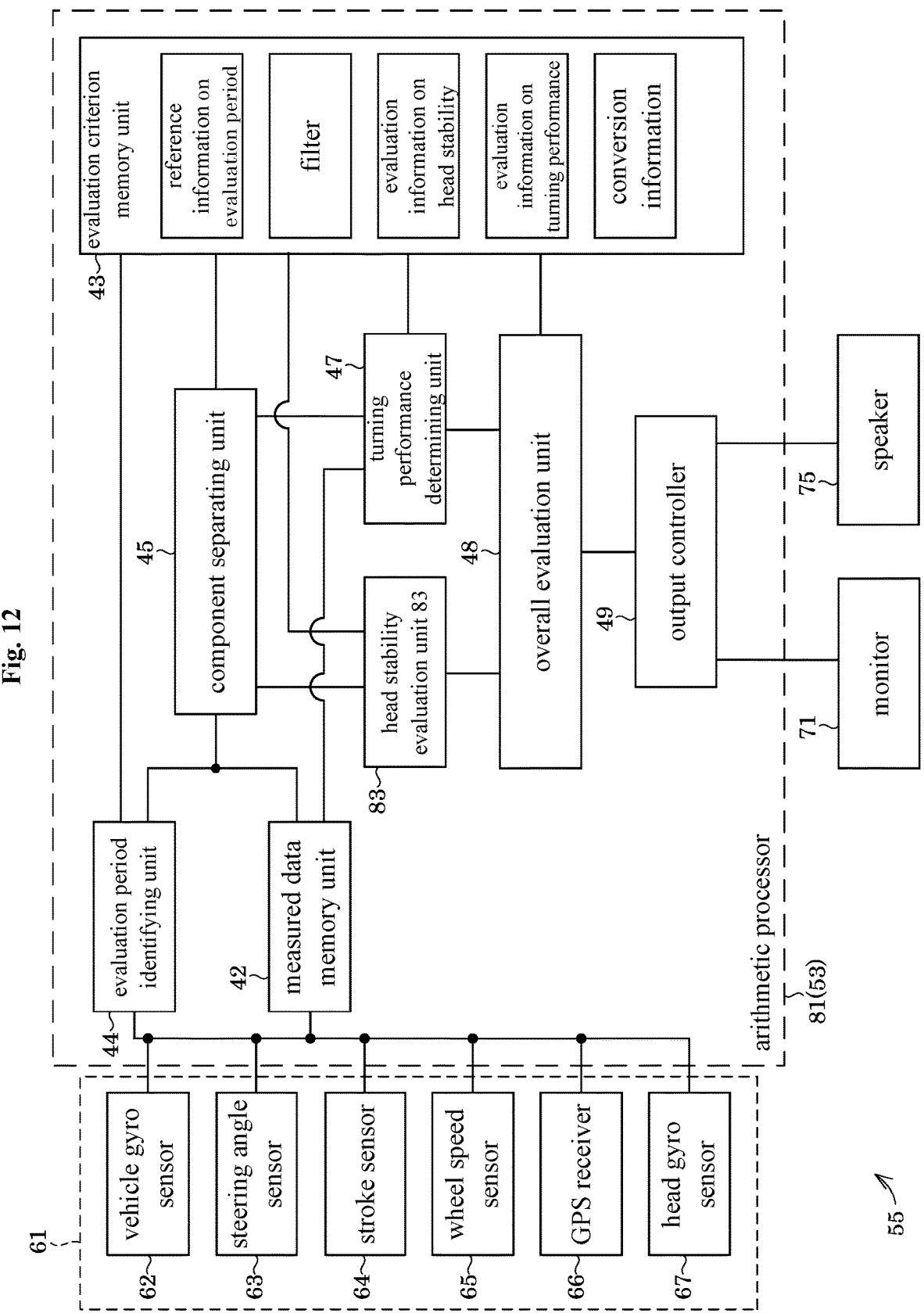
FIG. 12 is a functional block diagram of the evaluation system.

FIG. 12 is a functional block diagram of the evaluation system 55. The evaluation apparatus 53 includes an arithmetic processor 81. The arithmetic processor 81 is configured or programmed to be functionally divided into the measured data memory unit 42, the evaluation criterion memory unit 43, the evaluation period identifying unit 44, the component separating unit 45, a head stability evaluation unit 83, the turning performance determining unit 47, the overall evaluation unit 48, and the output controller 49. The head stability evaluation unit 83 and the like are implemented through processes that the controller 32 performs in accordance with the instructions of the evaluation programs.

The measured data memory unit 42 stores the various types of measured data obtained by the measuring unit 61.

The evaluation criterion memory unit 43 stores information on the evaluation period condition, the filter, evaluation information on the head stability, evaluation information on the turning performance, and the conversion information.

The evaluation period identifying unit 44 identifies the evaluation period based on the positional information obtained by the GPS receiver 66.

The component separating unit 45 performs processing for the head angular speed in addition to the vehicle angular speed and the vehicle angle. Specifically, the component separating unit 45 obtains the entire frequency band data on the head angular speed during the evaluation period from the measured data memory unit 42. The component separating unit 45 reads out a head filter from the evaluation criterion memory unit 43. The component separating unit 45 extracts high-frequency components and low-frequency components from the head angular speed using the head filter. The component separating unit 45 may also perform processing for the steering angle or the caster angle.

The head stability evaluation unit 83 evaluates the driving skills in terms of the head stability of the driver based on the measured data.

For instance, an integral value of an absolute value of the low-frequency components for the head angular speed increases and an integral value of an absolute value of the high-frequency components for the head angular speed decreases as the driver's head moves (swings) smoothly during travelling. In contrast to this, an integral value of an absolute value of the high-frequency components for the head angular speed increases and an integral value of an absolute value of the low-frequency components for the head angular speed decreases as the driver's head moves minutely or frequently during travelling. Consequently, the driving skills are able to be evaluated in term of the stability from a ratio of the integral value of the absolute value of the low-frequency components for the head angular speed and the integral value of the absolute value of the high-frequency components for the head angular speed. Especially, when the evaluation period is a turning-motion period, the driving skills about the head stability are likely to be reflected in the ratio mentioned above.

The following describes evaluation of the driving skills by the head stability evaluation unit 83 based on the head pitch rate.

The head stability evaluation unit 83 obtains low-frequency components and high-frequency components for the head pitch rate during the evaluation period from the component separating unit 45. The stability evaluation unit 83 calculates a ratio (hereinafter, referred to as a "head stability score H") of an integral value of an absolute value of the low-frequency components for the pitch rate and an integral value of an absolute value of high-frequency components for the pitch rate.

Here, a function and the like to calculate the head stability score H is contained in the evaluation information on the head stability. The evaluation information on the head stability defines an evaluation criterion different from that defined by the evaluation information on the turning performance. The head stability evaluation unit 83 performs the above processing with the evaluation information on the head stability read out from the evaluation criterion memory unit 43.

The head stability evaluation unit 83 is one non-limiting example of the first evaluation unit according to a preferred embodiment of the present invention. The head stability score H is one non-limiting example of the first evaluation result according to a preferred embodiment of the present invention. The evaluation information on the head stability is one non-limiting example of the first evaluation criterion information according to a preferred embodiment of the present invention.

The turning performance evaluation unit 47 may evaluate the driving skills based on the steering angle and the caster angle in addition to the vehicle angle and the average vehicle speed. Alternatively, the turning performance evaluation unit 47 may evaluate the driving skills based on at least one of the vehicle angle, the average vehicle speed, the steering angle, or the caster angle. The turning performance evaluation unit 47 can use at least either the measured data obtained by the wheel speed sensor 65 or the measured data obtained by the GPS receiver 66 to calculate the average vehicle speed $T_{speed}$ during the evaluation period.

The overall evaluation unit 48 obtains the overall characteristic score G based on the head stability score H and the turning performance score $T_v$. At this time, the overall evaluation unit 48 uses the conversion information. The conversion information defines the overall characteristic score G with the head stability score H and the turning performance score $T_v$. The conversion information preferably has the following features.

When the head stability score H is lower than a threshold, the conversion information defines the overall characteristic score G such that the overall characteristic score G decreases as the turning performance score $T_v$ increases.

When the stability score H is higher than the threshold, the conversion information defines the overall characteristic score G such that the overall characteristic score G increases as the turning performance score $T_v$ increases.

The conversion information defines the overall characteristic score G such that the overall characteristic score G increases as the head stability score H increases.

Specifically, the conversion information mentioned above preferably is a conversion map or a conversion function. The conversion map and the conversion function are generated empirically or experimentally. The threshold is also set appropriately.

The output controller 49 conveys the overall characteristic score G to at least either the monitor 71 or the speaker 75. The monitor 71 or the speaker 75 indicates the overall characteristic score G to the driver.

The following describes evaluation of the vehicle driving skills in the present preferred embodiment. The procedures of evaluating the driving skills by the evaluation system 55 of the present preferred embodiment are equal or substantially equal to that in Preferred Embodiment 1 (see FIG. 8). In Preferred embodiment 2, a "head stability evaluation" (described as a "Step 54H") is performed instead of the "vehicle stability evaluation" (Step S4) in FIG. 8. The following describes operations in Preferred Embodiment 2 with appropriate reference to FIG. 8.

The measuring unit 61 obtains measured data (Step S1). The evaluation period identifying unit 44 identifies an evaluation period for evaluating driving skills based on the measured data (Step S2). The component separating unit 45 extracts low-frequency components and high-frequency components from the measured data during the evaluation period (Step S3).

The head stability evaluation unit 83 obtains a head stability score H based on the low-frequency components and the high-frequency components for a head angular speed during the evaluation period (Step S4H). The turning performance evaluation unit 47 obtains a turning performance score $T_v$ based on the measured data during the evaluation period (Step S5).

The overall evaluation unit 48 obtains an overall characteristic score G based on the head stability score H and the turning performance score $T_v$ (Step S6). The overall evaluation unit 48 uses the conversion information read out from the evaluation criterion memory unit 43 to obtain the overall characteristic score G.

The output controller 49 transmits the overall characteristic score G to at least either the monitor 71 or the speaker 75. The monitor 71/speaker 75 indicates the overall characteristic score G (step S7).

As noted above, the driving skills of the two-wheeled motor vehicle 1 are able to be suitably evaluated in the same manner as Preferred embodiment 1. This allows provision of a stage of suppressing the turning performance score $T_v$ and a stage of enhancing the turning performance score $T_v$ based on the head stability score H.

Moreover, a course of enhancing the driving skills is able to be formed by the step of suppressing the turning performance score $T_v$ and selectively enhancing only the head stability score H and the step of enhancing both the head stability score H and the turning performance score $T_v$.

The measuring unit 61 is preferably external to the evaluation apparatus 53. That is, the measuring unit 61 is so-called an external measuring unit. Accordingly, the measuring unit 61 is able to be located at an appropriate position.

This allows the measuring unit 61 to measure the vehicle state accurately. Moreover, the evaluation apparatus 53 allows more accurate evaluation of the driving skills.

The monitor 71 is disposed external to the evaluation apparatus 53. That is, the monitor 71 is so-called an external output unit. Accordingly, the monitor 71 is able to be located at an appropriate position. This allows the monitor 71 to indicate the overall characteristic score G more suitably to the driver.

The speaker 75 preferably is also an external output unit. Accordingly, the speaker 75 is able to be located at an appropriate position. This allows the speaker 75 to indicate the overall characteristic score G more suitably to the driver.

The present invention is not limited to the above preferred embodiments, but may be modified as described below.

In the preferred embodiments mentioned above, the conversion information preferably includes the first to third features or the first to fourth features, for example. However, this is not limitative. For instance, the conversion information may be changed into one having at least neither the third feature nor the fourth feature. Alternatively, the conversion information may be changed into one having additional different feature(s).

In Preferred Embodiment 1 mentioned above, the fourth feature is explanatorily described. However, this is not limitative. For instance, the fourth feature may be changed into another different feature. For instance, when the vehicle stability score $S_v$ is the threshold b, the conversion information may define the overall characteristic score G such that the overall characteristic score G decreases as the turning performance score $T_v$ increases. Moreover, when the vehicle stability score $S_v$ is the threshold b, the conversion information may define the overall characteristic score G such that the overall characteristic score G increases as the turning performance score $T_v$ increases.

In the preferred embodiments mentioned above, the formulae (9) to (12) are explanatorily described as one example of the conversion function. However, this is not limitative. For instance, two or more conversion functions are prepared, and the functions are selectively used in accordance with a value of the vehicle stability score $S_v$. Such may be adopted. For instance, a first conversion function may be used when the vehicle stability score $S_v$ is equal to or more than the threshold b, and otherwise, a second conversion function may be used. Such a modification achieves usage of the first conversion function on which the first feature of the conversion information is clearly reflected. Similarly, the modification achieves usage of the second conversion function on which the second feature of the conversion information is clearly reflected.

In Preferred Embodiment 2 mentioned above, the evaluation apparatus 53 and the ECU 51 are individually disposed. However, this is not limitative. The ECU 51 and the evaluation apparatus 53 may be integrated by one device.

In Preferred Embodiment 1 mentioned above, a smartphone has been described as one example of the evaluation apparatus 31. However, this is not limitative. For instance, the evaluation apparatus 31 may be an information terminal, a portable computer, a PDA, a portable gaming machine, a car navigation system, and the like.

In Preferred Embodiment 1 mentioned above, the vehicle stability score $S_v$ is one example of the first evaluation result, and the turning performance score $T_v$ one example of the second evaluation result. However, this is not limitative. The vehicle stability score $S_v$ may be used as one example of the second evaluation result, and the turning performance score $T_v$ as one example of the first evaluation result. The same modification is applicable to Preferred Embodiment 2.

In Preferred Embodiment 1 mentioned above, both the two scores $S_v$ and $T_v$ that are the basis of the overall characteristic score G are the evaluation results based on the measured data on the vehicle state. Moreover, in Preferred Embodiment 2 mentioned above, a score H of the basis of the overall characteristic score G is the evaluation result based on the measured data on the driver state and another score $T_v$ is the evaluation result based on the measured data on the vehicle state. However, this is not limitative. Both the two scores that are the basis of the overall characteristic score G may be the evaluation results based on the measured data on the driver state.

In Preferred Embodiment 2 mentioned above, the head gyro sensor 67 measures the head angular speed and the head angle. However, this is not limitative. A photographing apparatus such as a camera may measure at least either the head angular speed or the head angle. Moreover, the photographing apparatus may measure a position or an attitude of a driver's site other than the head (e.g., a neck, a shoulder, and an arm). Moreover, an eyeball motion sensor or an eye camera may measure an eyeball motion of the driver.

In the preferred embodiments mentioned above, the first evaluation result, the second evaluation result, and the overall evaluation result are the scores $S_v$, $T_v$, and H, and G, respectively. However, this is not limitative. For instance, the driving skills may be evaluated in a plurality of classes. That is, the first evaluation result, the second evaluation result, and the overall evaluation result may be ranks (classes). This allows stepwise evaluation of the driving skills.

In Preferred Embodiment 2 mentioned above, the evaluation apparatus 53 may further include a vehicle stability evaluation unit 46. In this modification, the vehicle stability evaluation unit 46 may obtain the vehicle stability score $S_v$ based on the steering angle and the caster angle. Alternatively, the vehicle stability evaluation unit 46 may obtain the vehicle stability score $S_v$ based on at least one of the vehicle angular speed, the steering angle, or the caster angle. For instance, the vehicle stability evaluation unit 46 may obtain the vehicle stability score $S_v$ based on only the roll rate.

Moreover, in the modification, the overall evaluation unit 48 may obtain the overall characteristic score G based on any two of the scores $S_v$, $T_v$, and H.

In the preferred embodiments mentioned above, the two-wheeled motor vehicle 1 has been described as one example of the vehicle. However, this is not limitative. For instance, the vehicle may be a three-wheeled motor vehicle, or a four-wheeled motor vehicle. The evaluation apparatus 31, 53 and the evaluation system 55 described in the above preferred embodiments are suitably applicable to any type of the vehicle.

In the preferred embodiments mentioned above, the evaluation period identifying unit 44 takes the turning-motion period to satisfy a given condition as the evaluation period. However, this is not limitative. The evaluation period is settable appropriately. For instance, a period of time when the two-wheeled motor vehicle 1 travels linearly, a time when the two-wheeled motor vehicle 1 starts from its stop state, and a time when the two-wheeled motor vehicle 1 stops from its traveling state may be identified as the evaluation period.

The present preferred embodiments and the modifications described above may be varied or modified appropriately by replacing or combining elements or features of the various preferred embodiments or the modifications thereof.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A non-transitory computer readable medium including an evaluation program for evaluating vehicle driving skills using at least one of a sensor that measures a vehicle state, a sensor that measures a driver state, a Global Positioning System receiver, a steering angle sensor, a stroke sensor, and a wheel speed sensor, the evaluation program causing a computer to perform the steps of:

obtaining a first evaluation result of the vehicle driving skills based on measured data obtained by the at least one of the sensor that measures the vehicle state, the sensor that measures the driver state, the Global Positioning System receiver, the steering angle sensor, the stroke sensor, and the wheel speed sensor;

obtaining a second evaluation result of the vehicle driving skills based on the measured data;

obtaining an overall evaluation result of the vehicle driving skills based on the first evaluation result and the second evaluation result using conversion information; and conveying the overall evaluation result to an output unit; wherein the conversion information defines the overall evaluation result such that the overall evaluation result decreases as the second evaluation result increases if the first evaluation result is lower than a threshold, and such that the overall evaluation result increases as the second evaluation result increases if the first evaluation result is higher than the threshold.

2. The non-transitory computer readable medium according to claim 1, wherein the conversion information defines the overall evaluation result such that the overall evaluation result increases as the first evaluation result increases.

3. The non-transitory computer readable medium according to claim 1, wherein the conversion information is at least either a conversion function or a conversion map, the conversion function defining the overall evaluation result with the first evaluation result and the second evaluation result as variables, and the conversion map having the first evaluation result and the second evaluation result associated with the overall evaluation result.

4. The non-transitory computer readable medium according to claim 1, wherein the step of conveying the overall evaluation result to the output unit is performed by conveying the overall evaluation result in the form of information transmittable visibly to a driver or in the form of information transmittable auditorily to the driver.

5. An evaluation method of evaluating vehicle driving skills using at least one of a sensor that measures a vehicle state, a sensor that measures a driver state, a Global Positioning System receiver, a steering angle sensor, a stroke sensor, and a wheel speed sensor, the evaluation method comprising the steps of:

obtaining a first evaluation result of the vehicle driving skills based on measured data obtained by the at least one of the sensor that measures the vehicle state, the sensor that measures the driver state, the Global Positioning System receiver, the steering angle sensor, the stroke sensor, and the wheel speed sensor;

obtaining a second evaluation result of the vehicle driving skills based on the measured data;

obtaining an overall evaluation result from the first evaluation result and the second evaluation result using conversion information; and indicating the overall evaluation result to a driver via an output unit; wherein the conversion information defines the overall evaluation result such that the overall evaluation result decreases as the second evaluation result increases if the first evaluation result is lower than a threshold, and such that the overall evaluation result increases as the second evaluation result increases if the first evaluation result is higher than the threshold.

6. The evaluation method according to claim 5, wherein the conversion information defines the overall evaluation result such that the overall evaluation result increases as the first evaluation result increases.

7. The evaluation method according to claim 5, wherein the conversion information is at least either a conversion function or a conversion map, the conversion function defining the overall evaluation result with the first evaluation result and the second evaluation result as variables, and the conversion map having the first evaluation result and the second evaluation result associated with the overall evaluation result.

8. The evaluation method according to claim 5, wherein in the step of obtaining the overall evaluation result, the output unit indicates at least either a character representing the overall evaluation result or a color corresponding to the overall evaluation result.

9. The evaluation method according to claim 5, wherein in the step of indicating the overall evaluation result, the output unit indicates a graph having a two-dimensional coordinate with a first axis and a second axis, and a plotted point with a first axis coordinate as the first evaluation result and a second axis coordinate as the second evaluation result.

10. The evaluation method according to claim 5, wherein in the step of indicating the overall evaluation result, the output unit outputs sound indicating the overall evaluation result.

11. An evaluation apparatus that evaluates vehicle driving skills using at least one of a sensor that measures a vehicle state, a sensor that measures a driver state, a Global Positioning System receiver, a steering angle sensor, a stroke sensor, and a wheel speed sensor, the evaluation apparatus comprising:

a first evaluation unit that obtains a first evaluation result of vehicle driving skills based on measured data obtained by the at least one of the sensor that measures the vehicle state, the sensor that measures the driver state, the Global Positioning System receiver, the steering angle sensor, the stroke sensor, and the wheel speed sensor;

a second evaluation unit that obtains a second evaluation result of the vehicle driving skills based on the measured data;

an overall evaluation unit that obtains an overall evaluation result of the vehicle driving skills from the first evaluation result and the second evaluation result using conversion information; and an output controller that conveys the overall evaluation result to an output unit;

wherein the conversion information defines the overall evaluation result such that the overall evaluation result decreases as the second evaluation result increases if the first evaluation result is lower than a threshold, and such that the overall evaluation result increases as the second evaluation result increases if the first evaluation result is higher than the threshold.

12. The evaluation apparatus according to claim 11, further comprising a measuring unit that obtains the measured data.

13. The evaluation apparatus according to claim 11, wherein the output unit is controlled by the output controller to indicate the overall evaluation result to a driver.

14. A vehicle comprising the evaluation apparatus according to claim 11.

* * * * *